(12) United States Patent
Smith et al.

(10) Patent No.: US 10,685,301 B2
(45) Date of Patent: Jun. 16, 2020

(54) METHOD AND SYSTEM FOR PROVIDING SALES INFORMATION AND INSIGHTS THROUGH A CONVERSATIONAL INTERFACE

(71) Applicant: Mastercard International Incorporated, Purchase, NY (US)

(72) Inventors: Andrew J. Smith, St. Louis, MO (US); Siddique Hameed, Chesterfield, MO (US); Michael K. Forbis, St. Louis, MO (US); Stewart Boling, Chesterfield, MO (US); Adam Kenneth Hosp, Lake St. Louis, MO (US); Ted P. Sanders, Jr., Chesterfield, MO (US)

(73) Assignee: MASTERCARD INTERNATIONAL INCORPORATED, Purchase, NY (US)

(*) Notice: Subject to any disclaimer, the term of this patent is extended or adjusted under 35 U.S.C. 154(b) by 179 days.

(21) Appl. No.: 15/639,588

(22) Filed: Jun. 30, 2017

(65) Prior Publication Data
US 2018/0012163 A1 Jan. 11, 2018
US 2018/0225608 A9 Aug. 9, 2018

Related U.S. Application Data

(60) Provisional application No. 62/358,638, filed on Jul. 6, 2016, provisional application No. 62/507,890, filed on May 18, 2017.

(51) Int. Cl.
*G06Q 10/06* (2012.01)
*G06Q 20/40* (2012.01)
(Continued)

(52) U.S. Cl.
CPC ....... *G06Q 10/06311* (2013.01); *G06F 16/22* (2019.01); *G06F 16/243* (2019.01);
(Continued)

(58) Field of Classification Search
CPC ............ G06Q 10/00–50/00; G06F 1/00–40/00
(Continued)

(56) References Cited

U.S. PATENT DOCUMENTS 7,216,073 B2 * 5/2007 Lavi ..................... G06F 17/277
704/9
7,702,508 B2 * 4/2010 Bennett .................. G06F 17/27
704/257

(Continued)

OTHER PUBLICATIONS

International Search Report and Written Opinion issued by the International Search Authority dated Aug. 17, 2017 in corresponding PCT Application No. PCT/US2017/039404 (12 pages).

*Primary Examiner* — Alan S Miller
(74) *Attorney, Agent, or Firm* — Buchanan Ingersoll & Rooney PC

(57) ABSTRACT

A method and system are described that provide responses to natural language queries regarding the performance of a business. The method and system processes data from multiple data sources including information generated by the business and analyzes the data to provide actionable suggestions as to how to determine how to improve the performance of the business. The use of natural language queries allows for a merchant without a business intelligence background obtain these insights easily.

22 Claims, 8 Drawing Sheets

(51) Int. Cl.

| | | |
|---|---|---|
| *G06Q 20/10* | (2012.01) | |
| *G06N 3/00* | (2006.01) | |
| *G06F 16/22* | (2019.01) | |
| *G06F 16/33* | (2019.01) | |
| *G06Q 20/20* | (2012.01) | |
| *G06Q 30/00* | (2012.01) | |
| *G06F 16/242* | (2019.01) | |
| *G06F 40/30* | (2020.01) | |
| *G06F 40/295* | (2020.01) | |
| *G06N 5/04* | (2006.01) | |

(52) U.S. Cl.
CPC ........ *G06F 16/3344* (2019.01); *G06F 40/295* (2020.01); *G06F 40/30* (2020.01); *G06N 3/004* (2013.01); *G06Q 20/102* (2013.01); *G06Q 20/209* (2013.01); *G06Q 20/401* (2013.01); *G06Q 30/00* (2013.01); *G06N 5/04* (2013.01)

(58) Field of Classification Search
USPC ................................................ 705/7.11–7.42
See application file for complete search history.

(56) References Cited

U.S. PATENT DOCUMENTS

| | | | | |
|---|---|---|---|---|
| 8,538,915 | B2* | 9/2013 | Drissi | G06F 16/2452 707/603 |
| 8,793,173 | B2* | 7/2014 | Berkman | G06Q 30/02 705/35 |
| 9,367,607 | B2* | 6/2016 | Vee | G06Q 30/0241 |
| 2002/0196679 | A1* | 12/2002 | Lavi | G06F 17/277 365/200 |
| 2005/0080614 | A1* | 4/2005 | Bennett | G06F 17/27 704/9 |
| 2005/0086049 | A1* | 4/2005 | Bennett | G06F 17/27 704/4 |
| 2005/0154769 | A1* | 7/2005 | Eckart | G06Q 40/04 |
| 2005/0246275 | A1* | 11/2005 | Nelson | G06Q 20/102 705/40 |
| 2007/0143186 | A1* | 6/2007 | Apple | G06Q 30/02 705/14.48 |
| 2007/0265908 | A1* | 11/2007 | Berkman | G06Q 30/02 705/35 |
| 2009/0089217 | A1* | 4/2009 | Kroutik | G06Q 30/00 705/80 |
| 2012/0011139 | A1* | 1/2012 | Drissi | G06F 16/2452 707/760 |
| 2012/0078888 | A1* | 3/2012 | Brown | G06F 16/3329 707/723 |
| 2013/0157244 | A1* | 6/2013 | Eger | G09B 7/00 434/350 |
| 2013/0226563 | A1* | 8/2013 | Hirate | G06F 17/2795 704/9 |
| 2013/0282436 | A1* | 10/2013 | Quinn | G06Q 30/0202 705/7.31 |
| 2014/0101139 | A1* | 4/2014 | Gemert | G06Q 10/10 707/722 |
| 2014/0188935 | A1* | 7/2014 | Vee | G06Q 30/0241 707/771 |
| 2014/0258094 | A1* | 9/2014 | Jouhikainen | G06Q 40/08 705/38 |
| 2014/0278744 | A1* | 9/2014 | Lo Faro | G06Q 30/0201 705/7.29 |
| 2015/0134420 | A1* | 5/2015 | Unser | G06Q 30/0205 705/7.34 |
| 2015/0149243 | A1* | 5/2015 | Unser | G06Q 30/0201 705/7.29 |
| 2015/0365527 | A1* | 12/2015 | Chakravarthy | H04M 3/493 455/411 |
| 2016/0071017 | A1* | 3/2016 | Adjaoute | G06N 20/00 706/52 |
| 2016/0092895 | A1* | 3/2016 | Grossman | G06Q 30/0204 705/7.33 |
| 2016/0125298 | A1* | 5/2016 | Barker | G06F 16/24522 706/47 |
| 2016/0132908 | A1* | 5/2016 | von Walstrom | G06Q 30/0202 705/7.25 |
| 2016/0267495 | A1* | 9/2016 | Bernard | G06Q 30/0201 |
| 2017/0075988 | A1* | 3/2017 | Kadiri | G06F 16/3329 |
| 2017/0116621 | A1* | 4/2017 | Gerard | G06Q 30/0202 |
| 2017/0330196 | A1* | 11/2017 | Larko | G06Q 30/06 |
| 2017/0364918 | A1* | 12/2017 | Malhotra | G06Q 20/023 |

* cited by examiner

METHOD AND SYSTEM FOR PROVIDING SALES INFORMATION AND INSIGHTS THROUGH A CONVERSATIONAL INTERFACE

FIELD OF THE DISCLOSURE

The present disclosure relates to a method and system for providing sales information and insights to customers in response to conversational questions posed by users.

BACKGROUND

Small businesses have a wealth of information regarding their customers, supply chains, and other aspects of their day-to-day operations that are stored in a variety of locations. For example, transaction data entries and payment transactions that have been cleared forwarded to payment processors may include valuable information relevant to the optimization of operations at the small business. In addition, other sources of information exist that can help clarify the cause and effect relationship between external conditions and changes in the performance of the small business. Further, small businesses typically have some information stored in a merchant server that may include payments and purchases that have not yet been forwarded to payment processors, or other types of information including customer payment preferences and customer delivery or pickup preferences. Examples of data that may be extracted from such information include market share data. U.S. patent application Ser. No. 14/498,194 entitled "Method and System for Identifying Merchant Market Shares Based on Purchase Data" filed on Sep. 26, 2014 describes one way to obtain market share data from the information available from businesses and is incorporated by reference in its entirety.

Although this corpus of information is being generated by a typical small business, the resources are not ordinarily available for the small business to analyze this information to derive useful information the small business can use to improve their performance. Even if the small business has the resources to analyze this information and derive useful information, the techniques used to derive the useful information are specific to interpreting large volumes of various types of information and may not be within the skills of a typical small business owner. Accordingly a technical problem exists where there is a very specific skill set is needed to properly extract actionable information from the information generated by a typical business.

There therefore exists a need to address this technical problem by providing sales information and other insights through a conversational interface so that the small business owner can easily analyze the wealth of available information and derive useful information that can be used to improve the performance of the small business. The conversational interface is of particular use because the small business owner need not know specific terms of art needed to derive useful information and can instead simply submit natural language queries to determine how to improve the performance of their small business. The technical problem is therefore addressed by providing an easy to use interface that allows for actionable information to be extracted from the information generated by a typical business.

SUMMARY

The present disclosure provides for a method of providing responses to a natural language query comprising receiving a natural language query from a merchant, the merchant being associated with a merchant identifier, processing the natural language query to derive at least one intent and at least one entity, retrieving a plurality of transaction data entries, each transaction data entry including transaction data associated with a payment transaction having the merchant identifier associated with the merchant, identifying a set of the plurality of transaction data entries that correspond to the at least one derived intent or the at least one entity, calculating a response to the natural language query based on the set of the plurality of transaction data entries using at least one analytical model, generating a natural language response, based on the calculated response, to the natural language query, and transmitting the generated natural language response.

The method may further comprise retrieving a plurality of external information associated with the at least derived one intent or the at least one entity from at least one external data source, and identifying a set of the plurality of external information that correspond to the at least one derived intent or the at least one entity. The calculated response is further based on the set of the plurality of external information. When the at least one derived intent includes a scheduled task for monitoring the plurality of transaction data entries, the scheduled task has at least one triggering threshold where the identified set of the plurality of transaction data entries is updated based on the triggering threshold, and where the calculated response is updated based on the triggering threshold and the updated identified set of the plurality of transactions. When the derived intent is a request for explaining the generated natural language response, the at least one analytical model is transmitted. The method may further include retrieving another plurality of transaction data entries where each transaction data entry includes transaction data associated with a payment transaction not having the merchant identifier associated with the merchant. The calculated response may further be based on the another plurality of external information. The calculated response may remove identifying information from the another plurality of external information. The at least one data source includes merchant accounting software executing on a merchant server. The at least one derived intent includes one of a performance metric, a comparison metric, a timeframe, and a target user.

The present disclosure also provides for a system providing responses to a natural language query comprising a computing device configured to input into an interface a natural language query created by a merchant, and a processing server. The processing server includes a receiving device configured to receive the natural language query being input into the computing device being used by the merchant, where the merchant is associated with a merchant identifier, a natural language processor configured to derive at least one intent and at least one entity, a querying module configured to retrieve a plurality of transaction data entries where each transaction data entry including transaction data associated with a payment transaction having the merchant identifier associated with the merchant and also further configured to identify a set of the plurality of transaction data entries that correspond to the at least one derived intent or the at least one entity. The processing server further includes a calculation module configured to calculate a response to the natural language query based on the set of the plurality of transaction data entries using at least one analytical model, a natural language response module configured to generate a natural language response, based on the calculated response, to the natural language query, and a transmitting device configured to transmit the generated natural language response.

The querying module is further configured to retrieve a plurality of external information associated with the at least derived one intent or the at least one entity from at least one external data source, and identify a set of the plurality of external information that correspond to the at least one derived intent or the at least one entity. The calculation module is further configured to calculate the response based on the set of the plurality of external information. When the natural language processor derived intent includes a scheduled task for monitoring the plurality of transaction data entries, the scheduled task has at least one triggering threshold where the querying module updates the identified set of the plurality of transaction data entries based on the triggering threshold, and the calculation module updates the calculated response based on the triggering threshold and the updated identified set of the plurality of transactions. When the receiving device receives a request from the computing device of the merchant to explain the generated natural language response and when the natural language processor determines the derived intent is a request for explaining the generated natural language response, the transmitting device transmits the at least one analytical model used by the calculation module to generate the response on which the generated natural language response is based. The querying module is further configured to retrieve another plurality of transaction data entries where each transaction data entry including transaction data associated with a payment transaction not having the merchant identifier associated with the merchant, and where the calculation module calculated response is further based on the another plurality of external information. The querying module is further configured to remove identifying information from the another plurality of transaction data entries. The at least one data source includes merchant accounting software executing on a merchant server. The at least one derived intent includes one of a performance metric, a comparison metric, a timeframe, and a target user

BRIEF DESCRIPTION OF THE DRAWING FIGURES

DETAILED DESCRIPTION OF THE DISCLOSED EMBODIMENTS

Glossary of Terms

Figure 1:
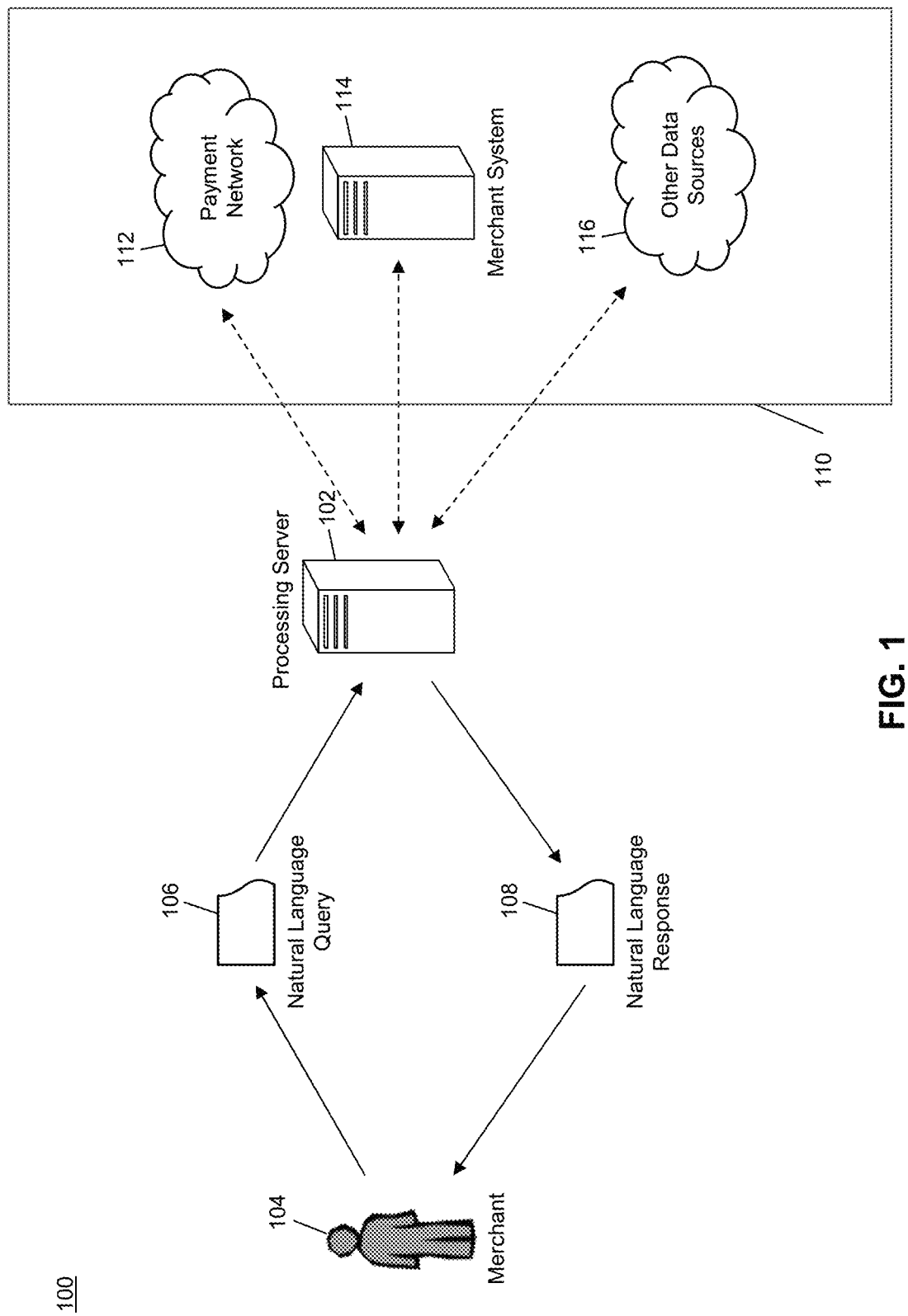
FIG. 1 depicts a system for providing sales information and insights through a conversational interface.

Payment Network—A system or network used for the transfer of money via the use of cash-substitutes for thousands, millions, and even billions of transactions during a given period. Payment networks may use a variety of different protocols and procedures in order to process the transfer of money for various types of transactions. Transactions that may be performed via a payment network may include product or service purchases, credit purchases, debit transactions, fund transfers, account withdrawals, etc. Payment networks may be configured to perform transactions via cash-substitutes, which may include payment cards, letters of credit, checks, transaction accounts, etc. Examples of networks or systems configured to perform as payment networks include those operated by MasterCard®, VISA®, Discover®, American Express®, PayPal®, etc. Use of the term "payment network" herein may refer to both the payment network as an entity, and the physical payment network, such as the equipment, hardware, and software comprising the payment network.

Payment Rails—Infrastructure associated with a payment network used in the processing of payment transactions and the communication of transaction messages and other similar data between the payment network and other entities interconnected with the payment network that handles thousands, millions, and even billions of transactions during a given period. The payment rails may be comprised of the hardware used to establish the payment network and the interconnections between the payment network and other associated entities, such as financial institutions, gateway processors, etc. In some instances, payment rails may also be affected by software, such as via special programming of the communication hardware and devices that comprise the payment rails. For example, the payment rails may include specifically configured computing devices that are specially configured for the routing of transaction messages, which may be specially formatted data messages that are electronically transmitted via the payment rails, as discussed in more detail below.

Transaction Account—A financial account that may be used to fund a transaction, such as a checking account, savings account, credit account, virtual payment account, etc. A transaction account may be associated with a consumer, which may be any suitable type of entity associated with a payment account, which may include a person, family, company, corporation, governmental entity, etc. In some instances, a transaction account may be virtual, such as those accounts operated by PayPal®, etc.

Merchant—An entity that provides products (e.g., goods and/or services) for purchase by another entity, such as a consumer or another merchant. A merchant may be a consumer, a retailer, a wholesaler, a manufacturer, or any other type of entity that may provide products for purchase as will be apparent to persons having skill in the relevant art. In some instances, a merchant may have special knowledge in the goods and/or services provided for purchase. In other instances, a merchant may not have or require any special knowledge in offered products. In some embodiments, an entity involved in a single transaction may be considered a merchant. In some instances, as used herein, the term "merchant" may refer to an apparatus or device of a merchant entity.

Issuer—An entity that establishes (e.g., opens) a letter or line of credit in favor of a beneficiary, and honors drafts drawn by the beneficiary against the amount specified in the letter or line of credit. In many instances, the issuer may be a bank or other financial institution authorized to open lines of credit. In some instances, any entity that may extend a line of credit to a beneficiary may be considered an issuer. The line of credit opened by the issuer may be represented in the form of a payment account, and may be drawn on by the beneficiary via the use of a payment card. An issuer may also offer additional types of payment accounts to consumers as will be apparent to persons having skill in the relevant art, such as debit accounts, prepaid accounts, electronic wallet accounts, savings accounts, checking accounts, etc., and may provide consumers with physical or non-physical means for accessing and/or utilizing such an account, such as debit cards, prepaid cards, automated teller machine cards, electronic wallets, checks, etc.

System for Providing Sales Information and Insights through a Conversational Interface FIG. 1 depicts a system 100 for providing sales information and insights through a conversational interface. The system 100 includes a processing server 102 that considers the natural language queries 106 from the merchant 104. The merchant 104 may enter the natural language query 106 into a computing device such as a smartphone, a tablet computer, a laptop computer, a personal computer, or a similar device (e.g., smart television, wearable device) that is in communication with the processing server 102.

The natural language query 106 allows for the merchant 104 to interact with the processing server 102 in a conversational manner. This is particularly useful for business owners who are not familiar with the types of analytics that may be performed on sales information. Examples of the conversational manner in which the natural language queries 106 may be structured include "What were my sales last Friday?" and "How are my sales this year compared to last year?" Although the queries need not be structured in the same manner as these examples and need not have a specific syntax or pattern, the system 100 contemplated here is able to extract the relevant intents and entities from queries 106 entered by the merchant through natural language processing. There are a number of ways this can be done at a level of detail such as disclosed in U.S. Pat. No. 7,216,073 filed Mar. 13, 2002 and entitled "Dynamic natural language understanding."

The merchant 104 is presented with an interface through which they may enter their natural language query 106. The merchant 104 may be presented with a chat interface similar to one that is available through various messaging systems such as Facebook Messenger®, Google Hangouts®, and WeChat®. In other embodiments, the merchant 104 may be presented with a customized chat interface that is provided on, for example, a web page of the service provider that is providing sales information and insights. For example, the merchant 104 may access a secured web site and enter natural language queries into a text box. Particularly when utilizing various messaging systems, the merchant 104 may appear to be interacting with another user of the messaging system, but would actually be interacting with the processing server 102. Entry of the natural language query 106 may occur through the use of a keyboard, through voice recognition, or through a combination of the keyboard and voice recognition. Other types of input may also be used to generate the natural language query 106. In some embodiments that utilize, for example, voice recognition, the recognition of the voice of the merchant and the translation of the voice into a natural language query 106 occurs at the computing device for the merchant 104. For example, the computing device for the merchant 104 may utilize a keyboard for text entry of a query and the computing device for the merchant may also present a voice recognition interface for entry of a query. In either instance, the computing device of the merchant 104 converts the input into a natural language query 106 suitable for the processing server 102 by deriving at least one intent and at least one entity. An intent may be a performance metric, a comparison metric, a timeframe, or a target of the query. When given a natural language query 106 of "How are my sales trending this month compared to my competition," an intent of the phrase may be "my sales" (target of query), "this month" (timeframe), and "compared to my competition" (measure of performance).

Associated with the natural language query 106 is a merchant identifier that is associated with the merchant 104. The merchant identifier is used by the processing server 102 to retrieve the appropriate information from the transaction database 210 and from the payment database 206. By using the merchant identifier, the natural language response 108 provided by the processing server 102 are specifically tailored to only reveal information to which the merchant 104 is entitled. For example, by associating a merchant identifier with the natural language query 106, the merchant 104 is prevent from entering a query such as "How were my competitor ACME Co.'s sales last week?" This prevents the exposure of confidential information from other merchants 104. The processing server 102 may however accept certain queries where the natural language response 108 includes information that cannot be directly attributed to a specific competitor. One such example natural language query 106 is "How are my sales trending this month compared to my competition?"

Using the intent and entity derived from the natural language query 106 along with the merchant identifier, the processing server 102 retrieves a plurality of transaction data entries 212 from the transaction database 210 where each of the transaction data entry 212 includes transaction data associated with a payment transaction 208 from the payment database 206 for the merchant 104. This type of information is typically found within a payment processor that handles payments between merchants 104 and consumers, for example. The processing server 102 may request this information from the transaction database 210 and the payment database 206 by using the merchant identifier, for example. This helps ensure the generated natural language response 108 only includes the information to which the merchant 104 is entitled. More specifically, when retrieving a plurality of transaction data entries 212 from the transaction database 210 of a payment processor including transaction data associated with a payment transaction 208 from the payment database 206 of a payment processor, information associated with another merchant identifier will not be made available to the processing server 102. By preventing such availability, the confidentiality of other merchants and the confidentiality of the information of the other merchants is ensured. Other techniques may be employed to further ensure a merchant cannot directly access the information of other merchants. The information of other merchants may, however, be provided by the processing server 102 in an aggregated and anonymized manner.

Using the intent and entity derived from the natural language query 106, the processing server 102 may also access additional databases 226 available to the processing server 102 to expand the number of queries that can be responded to. external data sources 110 including payment networks 112, merchant systems 114, and other data sources 116 available to the processing server 102. Such additional databases 226 are accessed when the natural language query 106 provides the intent or entity where the external data sources 110 can provide information responsible to the query 106.

Typically, the additional databases 226 contain information that are proprietary or otherwise not freely available for public consumption. Accordingly, in the embodiment of the processing server 102 depicted in FIG. 2, the additional databases 226 are depicted as being part of the processing server 102. Embodiments where the processing server 102 includes the additional databases 226 may periodically receive updates to the database 226 from a data provider or otherwise receive updates to the information contained in the additional databases 226. In some other embodiments, the processing server 102 securely accesses the information from additional databases 226 that are not contained within the processing server 102. More specifically, in such an embodiment, the information from the additional databases 226 is received by the processing server 102 by way of the receiving device 202. Although the additional databases 226 described in this example does not require contain confidential information, the system and method 100 described here also contemplates additional databases 226 which may include information that is to be anonymized. Protections to ensure the confidentiality of other merchants and other individuals and the confidentiality of the information of the other merchants and individuals are employed when these types of additional databases 226 are utilized, but as discussed above, such information may be provided in an aggregated and anonymized manner.

Using the intent and entity derived from the natural language query 106, the processing server 102 may also access external data sources 110 including payment networks 112, merchant systems 114, and other data sources 116 available to the processing server 102. Such external data sources 110 are accessed when the natural language query 106 provides the intent or entity where the external data sources 110 can provide information responsible to the query 106. For example, a natural language query 106 "Are my sales affected by rain?" may cause the processing server 102 to access other data sources 116 such as a publicly available weather database. Although the external data source 110 described in this example does not require the merchant identifier, the system and method 100 described here also contemplates external data sources 110 which require the merchant identifier to provide information to the processing server 102. When a merchant identifier is needed to access external data sources 110, similar protections to ensure the confidentiality of other merchants and the confidentiality of the information of the other merchants, but as discussed above, such information may be provided in an aggregated and anonymized manner.

By including the ability to access additional databases 226 and external data sources 110, the system and method 100 disclosed here increases the number of natural language queries 106 it is capable of providing natural language response 106 to. For example, a natural language query 106 "What is the average income for my customer base?" may cause the processing server 102 to access additional databases 226 or external data sources 110 so that sufficient information is collected to provide an appropriate natural language response 108. Given the above example natural language query 106, the system 100 may determine the example natural language query 106 has an intent of determining average incomes, and an entity of the merchant 104 customer base. The processing server 102 then accesses an additional database 226 containing average income information associated with street addresses, and compares this information with the customer base information available to the merchant 104 so that the natural language query 106 receives a response.

In another specific example of an other data source, the processing server 102 may access a merchant server 114 to obtain information that is not yet available in other sources such as the payment networks 112, the payment database 206, or the transaction database 210. For example, the merchant 104 may use merchant accounting software on the merchant server 114 to store information from sales that is not transmitted to payment networks 112, the payment database 206, or the transaction database 210 such as customer payment preferences and customer delivery or pickup preferences. The processing server 102 accesses this information from the merchant server 114 by using standard access techniques such as an application programming interface (API). By accessing such information, a merchant 104 can create natural language queries 106 that access information available only through the merchant accounting software on the merchant system 114. For example, the natural language query 106 may be "How many of my customers prefer to prepay before we render our services?"

The processing server 102 then identifies a set of the transaction data entries 212 and, if needed, identifies a set of additional from external data sources 110 and/or additional databases 226. The processing server 102 relies on the derived intent and/or the derived entity to identify the set of the transaction data entries 212 and the set of the external information from external data sources 110 and/or additional databases 226. By identifying the sets, the processing server 102 reduces the amount of information that must be processed to calculate a response to the natural language query based on the transaction data entries using at least one analytical model. To generate the response, at least one analytical model is employed to process the sets of information by performing calculations on the sets of information to derive useful information.

In some embodiments, the processing server 102 may provide predictions of future performance in response to the natural language query 106. For instance, the intent derived from the natural language query 106 may be a request for the prediction of future performance of the merchant 104. For example, the natural language query 106 may be "How many customers should I expect on Friday night?" or "What will my busiest day be next week?" The processing server 102 may derive the intent from the natural language query 106 and, based on the transaction data and other data sources 116, as discussed above, predict the future performance of the merchant 104 to answer the merchant's natural language query 106. For example, the processing server 102 may review the number of customers at the merchant 104 every Friday night over time to find the average number of Friday night customers, as well as compare the upcoming Friday night to past Fridays (e.g., time of the month, month, specific day, weather, etc.), and predict the number of customers the merchant 104 should expect for the next Friday. The processing server 102 may then use the prediction in the response being provided to the merchant 104.

To provide the response to the merchant 104 in a conversational manner, a natural language response 108 is generated from the response by the processing server 102. The natural language response 108 is then provided to the merchant 104 in a manner similar to how the natural language query 106 was received. More specifically, the interface through which the merchant 104 entered the natural language query 106 is utilized to provide the natural language response 108. In some embodiments, the natural language query 106 may be provided to the merchant 104 in a periodic manner or in a delayed manner so the merchant 104 approves the use of an alternate interface for the system 100 to provide the natural language response 108. Other types of natural language queries 106 may be provided such as a natural language query 106 with a scheduled task having a triggering threshold. Such a natural language query 106 may be "Send me a message if today's sales are 20% lower than historical values." With such a natural language query 106, the processing server 102 monitors the relevant database and/or data source so that when the triggering threshold is met, a natural language 108 is provided. For example, a merchant 104 may submit a natural language query 106 by interacting with a Google Hangouts bot which requires consideration of a substantial amount of information. Accordingly, the merchant 104 may approve receipt of the natural language response 108 by way of an SMS message. As another example, a merchant 104 may submit a natural language query 106 using Google Hangouts by asking "Send me a text message if today's sales are 20% lower than historical values." Regardless of the interface used, the natural language response 108 is transmitted so that the merchant 104 may consider the information contained in the natural language response 108. The natural language response 108 is received by the computing device being used by the merchant 104. In some embodiments, the natural language response 108 is received by an alternate device such as a voice natural language response by way of a voice telephone call.

In some embodiments, the processing server 102 may be configured to provide natural language responses 108 as proactive alerts to the merchant 104, such as in instances where no natural language query 106 may be submitted. For instance, the processing server 102 may utilize the transaction data and other data sources 116 to identify metrics based on the current status of the merchant 104, such as with respect to both the market performance of the merchant 104 and demographics of the consumer base of the merchant 104. The processing server 102 may compare these metrics with prior performance of the merchant 104, one or more related merchants, the market industry of the merchant 104, a geographic area that includes the merchant 104, etc. If the current metrics of the merchant 104 are different from the compared metrics by a predetermined threshold (e.g., one or more standard deviations, a percentage, etc.), then the processing server 102 may provide the merchant 104 with a proactive alert. The proactive alert may be a natural language response 108 that is generated by the processing server 102 that includes the merchant's current status and the difference between the merchant's current status and the compared metric(s).

For example, the merchant 104 may continue doing business and may not submit a natural language query 106. The processing server 102 may monitor the current performance of the merchant 104 and may identify an instance when the merchant's performance deviates from their historical performance. In such an instance, the processing server 102 may generate a natural language response 108 to provide to the merchant 104. For instance, the processing server 102 may identify a change in one of the market demographics for the merchant 104 and provide a natural language response 108 stating that "It looks like 3 months ago, 30% of your customers were females between the ages of 25 and 35. This month they made up less than 5% of your business. You should target them with advertising to get them back." In some cases, the processing server 102 may also provide proactive alerts when merchant performance is better than past or comparable metrics. For example, the natural language response 108 for a proactive alert may state "Your sales were up over 10% last week. That's about 50% better than your competition."

The natural language response 108 considered by the merchant 104 may include audio, graphical, textual, or other types of information the system 100 considers useful for understanding the calculated response. For example, the calculated response may result be a sales increase per year derived from transaction data entries. With such a calculated response, the natural language response 108 may include a graphical representation of the annual sales increase derived from transaction data entries so that consideration by the merchant 104 may be facilitated.

In at least some situations, the merchant 104 may desire to understand the reasons the natural language response 108 was provided in response to the natural language query 106. When the merchant 104 provides a natural language query 106 that desires the reasons the response 108 was generated, the system 100 provides the reasoning contained in the analytical models used to calculate the response on which the natural response is based 108.

In some embodiments, the processing server 102 may utilize an artificial intelligence (AI). The processing server 102 may use an AI to identify metrics for inclusion in a natural language response 108, including for the identification of predictions for future performance based on historical data for the merchant 104, related merchants, the market industry of the merchant 104, a geographic area including the merchant 104, etc. Additional data regarding the use of AI for predictive models and identifying predictions of future performance can be found in U.S. patent application Ser. No. 14/941,586, entitled "Method of Operating Artificial Intelligence Machines to Improve Predictive Model Training and Performance," filed on Nov. 14, 2015, which is herein incorporated by reference in its entirety. The AI may be configured to identify predictions, as well as identify proactive alerts for inclusion in natural language responses 108. In some instances, the AI may improve intelligence based on merchant feedback and other data. For example, the merchant 104 may provide feedback on the effectiveness of proactive alerts, which the AI may use to improve alerts that are provided to the merchant 104. In another example, the AI may analyze transaction data and other data received that is related to a prior prediction provided to the merchant 104, such as to determine the effectiveness of such a prediction for use in improving future predictions. For instance, the AI may provide a prediction of the number of customers the merchant 104 will have on a given night, may analyze the actual number of customers the merchant 104 had on the night, and may use such data (e.g., how close the prediction was, if it was above or below the actual amount, etc.) and use that data to improve the AI for future predictions.

Processing Server

Figure 2:
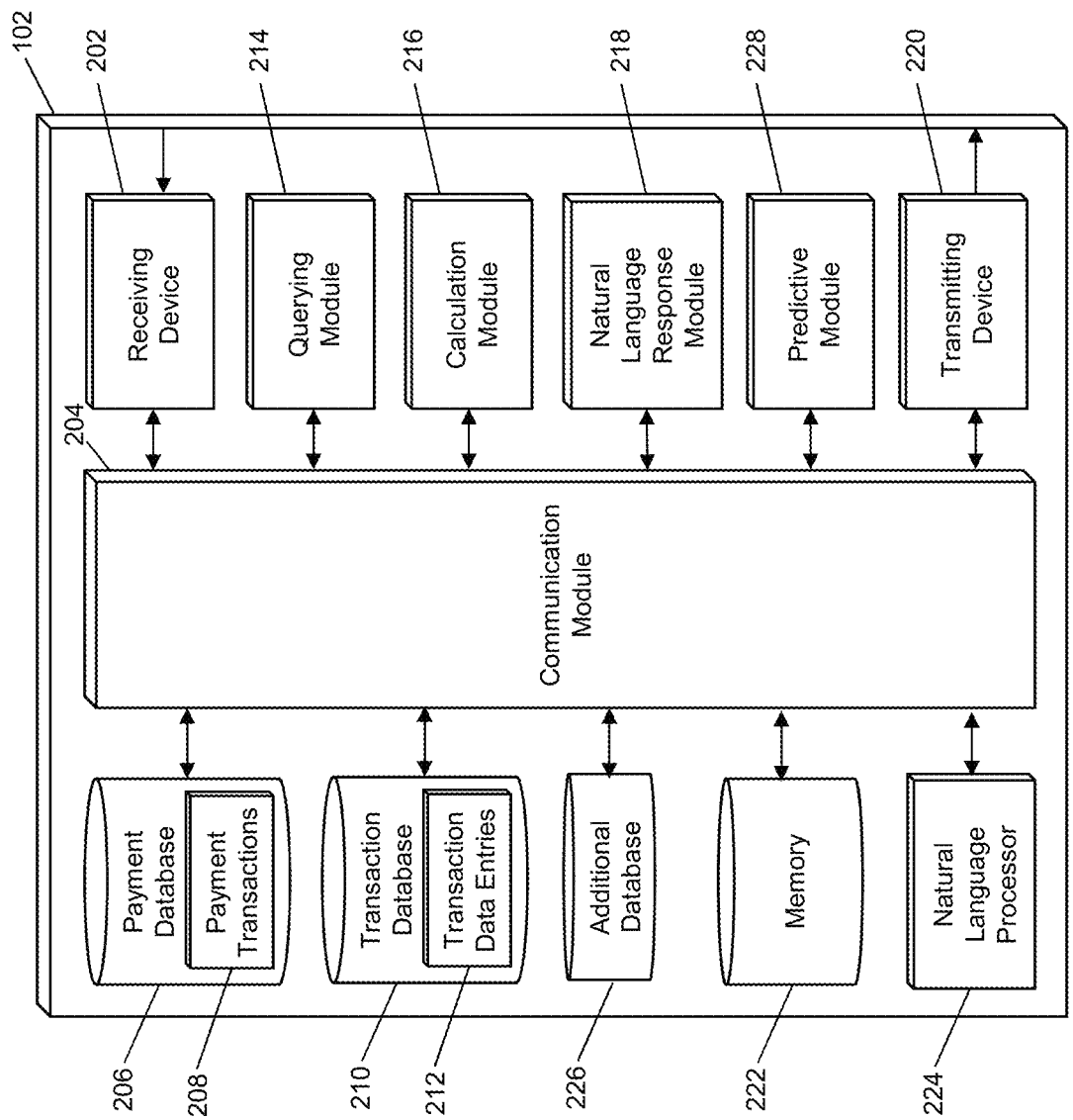
FIG. 2 depicts the processing server.

FIG. 2 illustrates an embodiment of a processing server 102 in the system 100. It will be apparent to persons having skill in the relevant art that the embodiment of the processing server 102 illustrated in FIG. 2 is provided as illustration only and may not be exhaustive to all possible configurations of the processing server 102 suitable for performing the functions as discussed herein. For example, the computer system 700 illustrated in FIG. 7 and discussed in more detail below may be a suitable configuration of the processing server 102.

The processing server 102 may include a receiving device 202. The receiving device 202 may be configured to receive data over one or more networks via one or more network protocols. In some embodiments, the receiving device 202 may be configured to receive data over the payment rails, such as using specially configured infrastructure associated with payment networks 116 for the transmission of transaction messages that include sensitive financial data and information. In some instances, the receiving device 202 may also be configured to receive data from ticketing entities 106, computing devices 110, payment networks 116, and other entities via alternative networks, such as the Internet. In some embodiments, the receiving device 202 may be comprised of multiple devices, such as different receiving devices for receiving data over different networks, such as a first receiving device for receiving data over payment rails and a second receiving device for receiving data over the Internet. The receiving device 202 may receive electronically transmitted data signals, where data may be superimposed or otherwise encoded on the data signal and decoded, parsed, read, or otherwise obtained via receipt of the data signal by the receiving device 202. In some instances, the receiving device 202 may include a parsing module for parsing the received data signal to obtain the data superimposed thereon. For example, the receiving device 202 may include a parser program configured to receive and transform the received data signal into usable input for the functions performed by the processing device to carry out the methods and systems described herein.

The receiving device 202 may be configured to receive data signals electronically transmitted by computing devices employed by merchants 104, which may be superimposed or otherwise encoded with data. For example, natural language queries 106 will be received by the receiving device 202. The natural language queries 106 may include, for example, the textual equivalent of the actual query presented by the merchant 104, a preprocessed equivalent of the actual query presented by the merchant 104, or a combination thereof. In some embodiments, the natural language query 106 may include data indicating at least one intent and at least one entity. In other embodiments, the natural language query 106 may include data that needs additional processing to derive the at least one intent and at least one entity. The receiving device 202 may also be configured to receive data signals electronically transmitted by data providers for the information contained in additional databases 226, external data sources 110 such as payment networks 112, merchant systems 114, and other publicly available data sources such as historical weather reports, geographical information, and other information suitable for further processing. In some embodiments, the receiving device 202 may be further configured to receive data for storage in the processing server 102, as discussed in more detail below, such as the received natural language query 106, previously retrieved data from external data sources 110 that need not be refreshed, and other information received by the processing server 102.

The processing server 102 may also include a communication module 204. The communication module 204 may be configured to transmit data between modules, engines, databases, memories, and other components of the processing server 102 for use in performing the functions discussed herein. The communication module 204 may be comprised of one or more communication types and utilize various communication methods for communications within a computing device. For example, the communication module 204 may be comprised of a bus, contact pin connectors, wires, etc. In some embodiments, the communication module 204 may also be configured to communicate between internal components of the processing server 102 and external components of the processing server 102, such as externally connected databases, display devices, input devices, etc. The processing server 102 may also include a processing device. The processing device may be configured to perform the functions of the processing server 102 discussed herein as will be apparent to persons having skill in the relevant art. In some embodiments, the processing device may include and/or be comprised of a plurality of engines and/or modules specially configured to perform one or more functions of the processing device, such as a querying module 214, calculation module 216, response generation module 218, natural language processor 224, and natural language generator 226. As used herein, the term "module" may be software or hardware particularly programmed to receive an input, perform one or more processes using the input, and provides an output. The input, output, and processes performed by various modules will be apparent to one skilled in the art based upon the present disclosure.

The processing server 102 includes a payment database 206 that contains payment transactions 208 and a transaction database 210 that contains transaction data entries 212. Such payment transactions 208 and transaction data entries 212 are associated with at least one merchant identifier so that only the payment transactions 208 and the transaction data entries 212 the merchant 104 is entitled to are provided. Such enforcement of confidentiality may occur at the payment transaction 208, the payment database 206, the transaction data entries 212, the transaction database 210, or the querying module 214. In some embodiments, enforcement of confidentiality occurs at multiple levels to provide reliable confidentiality.

The processing server 102 may include a querying module 214. The querying module 214 may be configured to execute queries on databases 206, 210 to identify sets of information. More specifically, the querying module 214 may retrieve a plurality of data entries and identify a set of the plurality of entries that satisfy certain criteria to reduce the amount of data that must be considered when calculating a response. The querying module 214 may receive one or more data values or query strings, and may execute a query string based thereon on an indicated database 206, 210 to identify information stored therein. The querying module 214 may then output the identified sets of information to an appropriate engine or module of the processing server 102 as necessary. The querying module 214 may, for example, execute a query on the payment database 206 to identify payment transactions 208 related to a merchant 104 with a merchant identifier. The querying module 214 may also execute queries on the transaction database 210, such as to identify transaction data entries 212 related to a merchant 104 with a merchant identifier. In some embodiments, the querying module 214 may monitor database 206, 210 for specific trends or transactions. For example, the querying module 214 may monitor database 206, 210 to determine if the day's sales are lower than historical sales. The querying module 214 may also utilize the at least one extent and entity obtained from the natural language query 106 to execute a query.

The querying module 214 may also execute queries on external data sources 110 and additional databases 226. The querying module 214 may employ any appropriate API to obtain the desired information from the external data sources 110 and additional databases 226. More specifically, the querying module 214 may retrieve a plurality of data entries and identify a set of the plurality of entries that satisfy certain criteria to reduce the amount of data that must be considered when calculating a response. Certain external data sources 110 and additional databases 226 may contain information that may reveal information to merchant 104 that it is not entitled to. For example, a payment network 112 may provide access to payment transactions based on a geographic location. Information obtained from the payment network 112 that includes merchant identifiers will be modified by the querying module 214 to ensure the merchant 104 only obtains information for which it is entitled.

The processing server 102 may also include a calculation module 216. The calculation module 216 may be configured to perform determinations for the processing server 102 for performing the functions discussed herein. The calculation module 216 may receive instructions as input, may perform determinations based on the instructions, and output a result of the calculation in accordance with an analytical model to another module or engine of the processing server 102. In some instances, the calculation module 216 may receive data for use in the calculation as input. In other instances, the calculation module 216 may be configured to obtain data for use in calculations, such as by instructing the querying module 214 to perform corresponding queries. The calculation module 216 may be configured to calculate, in accordance with an analytical model, useful information responsive to the natural language query 106. Multiple analytical models performing in an ensemble may also be used by the calculation module 216 to perform calculations responsive to the natural language query 106. In some embodiments, the calculation module 216 may execute calculations to identify specific trends or transactions. For example, the calculation module 216 may execute calculations to determine if the day's sales are lower than historical sales. In some embodiments, the calculation module 216 may be further configured to perform calculations irrespective of a natural language query 106, such as for the identification of metrics for the merchant 104 or other merchants, market industries, market demographics, etc., such as may be used for proactive alerts.

The processing server 102 also includes a natural language response module 218. The natural language response module 218 generates a natural language response 108 based on the result of the calculation by the calculation module 216. The natural language response 108 is a conversational response to the natural language query 106 by the merchant 104. In some embodiments, based on the natural language query 106 by the merchant 104, the queries made by the querying module 214, and the calculations made by the calculating module 216, the natural language response module 218 generates a natural language response 108 to be provided to the merchant 104.

The natural language response 108 generated by the natural language response module 218 may include audio, graphical, textual, or other types of information considered useful for facilitating the understanding of the merchant 104 of the calculated response. For example, the calculated response may result be a sales increase per year derived from transaction data entries. With such a calculated response, the natural language response 108 generated by the natural language response module 218 may include a graphical representation of the annual sales increase derived from transaction data entries so that consideration by the merchant 104 may be facilitated.

When the natural language query 106 from the merchant 104 seeks the reasons why a natural language response 108 was provided, the processing server 102 provides the merchant 104 with the analytical models used by the calculation module 216 so that the merchant 104 can have an improved understanding as to why the natural language response 108 was provided.

The processing server 102 may also include a predictive module 228. The predictive module 228 may be configured to make predictions for the processing server 102 as part of the functions of the processing server 102 discussed herein. The predictive module 228 may receive an instruction as input, may make a prediction based on the instruction, and may output the prediction to another module or engine of the processing server 102. In some instances, the instruction may be accompanied by data for use by the predictive module 228 in identifying the prediction. In other instances, the predictive module 228 may be configured to identify (e.g., via instructions to the querying module 214) data for use in the requested prediction. The predictive module 228 may use one or more predictive models in making predictions, which may be generated based on data trends as analyzed by the modules and engines of the processing server 102. In some embodiments, the predictive module 228 may utilize an AI, such as may be stored in a memory 222 of the processing server 102, for identifying predictions. In some cases, the predictive module 228 may update predictive models based on results of predictions made thereby, such as by comparing predictions to data received by the receiving device 202 corresponding to the target of the predictions.

The processing server 102 may also include a transmitting device 220. The transmitting device 220 may be configured to transmit data over one or more networks via one or more network protocols. In some embodiments, the transmitting device 220 may be configured to transmit data over the payment rails, such as using specially configured infrastructure associated with payment networks 116 for the transmission of transaction messages that include sensitive financial data and information, such as identified payment credentials. In some instances, the transmitting device 220 may be configured to transmit data to computing devices being used by merchants 104 and external data sources 110 such as payment networks 112, merchant systems 114, and other data sources 116. In some embodiments, the transmitting device 220 may be comprised of multiple devices, such as different transmitting devices for transmitting data over different networks, such as a first transmitting device for transmitting data over the payment rails and a second transmitting device for transmitting data over the Internet. The transmitting device 220 may electronically transmit data signals that have data superimposed that may be parsed by a receiving computing device. In some instances, the transmitting device 220 may include one or more modules for superimposing, encoding, or otherwise formatting data into data signals suitable for transmission.

The processing server 102 may also include a memory 222. The memory 222 may be configured to store data for use by the processing server 102 in performing the functions discussed herein. The memory 222 may be configured to store data using suitable data formatting methods and schema and may be any suitable type of memory, such as read-only memory, random access memory, etc. The memory 222 may include, for example, encryption keys and algorithms, communication protocols and standards, data formatting standards and protocols, program code for modules and application programs of the processing device, and other data that may be suitable for use by the processing server 102 in the performance of the functions disclosed herein as will be apparent to persons having skill in the relevant art. In some embodiments, the memory 222 may be comprised of or may otherwise include a relational database that utilizes structured query language for the storage, identification, modifying, updating, accessing, etc. of structured data sets stored therein.

The memory 222 may be configured to store data associated with an AI and predictive models for use thereof. The memory 222 may also be configured to store metrics, wherein the metrics may be related to merchant performance and/or market demographics. The metrics may be associated with a time and/or date, geographic location, the merchant 104, one or more related merchants, the merchant industry involving the merchant 104, etc. For example, the metrics may include market performance of the merchant industry involving the merchant 104 in a geographic area including the merchant 104, or any other metric that may be useful for a merchant 104 as will be apparent to persons having skill in the relevant art.

A natural language processor 224 is utilized by the processing server 102 to process the query 106 and derive at least one intent and at least one entity from the query 106. The natural language query 106 is received by the processing server 102 through the receiving device 202. The natural language query 106 is received either directly from the merchant 104 or from a computing device for the merchant 104 such as a smartphone. In some embodiments, the natural language processor 224 may be a computer or a network of computers dedicated to natural language processing. In such embodiments, the computer or network of computers dedicated to natural language processing communicate with the processing server 102 to serve the function of the natural language processor 224 depicted in FIG. 2. The natural language processor 224 uses general learning algorithms that may be grounded in statistical inferences to automatically learn language rules through the analysis of a corpus of prior interactions. Multiple classes of machine learning algorithms may be employed including decision trees and probabilistic decision models using real-valued weights so that a relative certainty as to the intended meaning of the natural language query 106 may be derived. In some embodiments, the natural language processor 224 uses feedback from the merchant 104 to improve its processing of future natural language queries 106. In still further embodiments, a human will review the interactions between the merchant 104 and the system 100 and provide input to improve the processing of future natural language queries 106 by the natural language processor 224. In some embodiments, the general learning algorithms are combined with hard coded sets of rules to further improve processing of the query 106.

Regardless of the specific algorithm or combination of algorithms employed, the natural language processor 224 extracts at least one intent and at least one entity from the natural language query 106. The natural language processor 224 provides such intent and entity information to, for example, the querying module 214, calculation module 216, and the natural language response module 218. Such information provided by the natural language processor 224 provides the information needed for the other modules 214, 216, 218 need to perform their functions.

Figure 3:
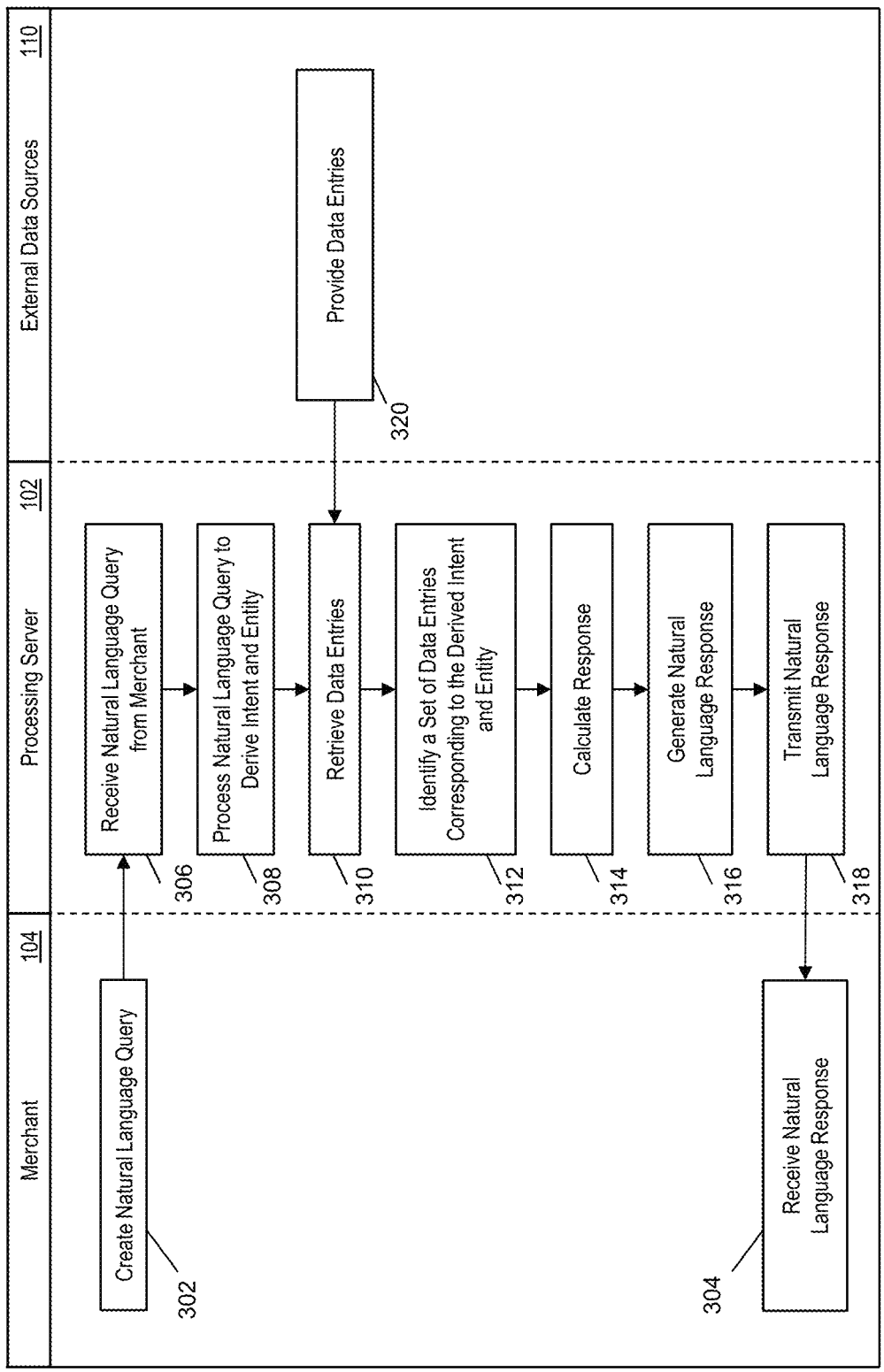
FIG. 3 depicts a method for providing sales information and insights through a conversational interface.

Method for Providing Sales Information and Insights through a Conversational Interface FIG. 3 depicts a method 300 for providing sales information and insights through a conversational interface.

At step 302, the merchant 104 creates a natural language query 106 by providing input to an interface presented by a computing device. The processing server 102 receives the natural language query 106 from the computing device being used by the merchant 104 at step 306. Here, the receiving device 202 of a processing server 102 may be employed to receive the natural language query 106 from the computing device being used by the merchant 104.

The natural language query 106 is processed by the natural l language processor 224 to derive the intent and entity at step 308. General learning algorithms grounded in statistical inferences may be employed to derive the intent and entity of natural language queries 106. Multiple classes of machine learning algorithms may be employed including decision trees and probabilistic decision models using real-valued weights so that a relative certainty as to the intended meaning of the natural language query 106 may be derived.

Step 310 of the method retrieves data entries from data sources using the querying module 214 of the processing server 102 where the data sources include a payment database 206, a transaction database 210, additional databases 226, and external data sources 110. More specifically, step 310 retrieves a plurality of data entries and identifies a set of the plurality of entries that satisfy certain criteria. During the execution of step 310, a query on the payment database 206 to identify payment transactions 208 related to a merchant 104 with a merchant identifier may execute either sequentially or in parallel with other queries such as queries on the transaction database 210 to identify transaction data entries 212 related to a merchant 104 with a merchant identifier. In addition, a query to an additional database 226 or an external data source 110 may execute either sequentially or in parallel with other queries so that data entries are provided as shown in step 320. The external data sources 110 may include merchant account software on the merchant server 114, for example. Step 312 of the method uses the querying module 214 of the processing server 102 to identify a set of data entries from a payment database 206, a transaction database 210, additional databases 226, and external data sources 110 that correspond to the derived intent and entity.

Step 314 of the method calculates a response using the calculation module 216 based on the set of data entries that correspond to the derived intent and entity. The calculated response may be made based on at least one analytical model. Multiple analytical models performing in an ensemble may also be used by the calculation module 216 to perform calculations responsive to the natural language query 106. In some embodiments, the calculation module 216 may execute calculations to identify specific trends or transactions. For example, the calculation module 216 may execute calculations to determine if the day's sales are lower than historical sales. In some instances, the natural language query 106 may request a prediction. In such instances, the calculation module 216 may utilize the predictive module 228, which may utilize on or more prediction models to identify the prediction requested by the merchant 104 based on the set of data entries that correspond to the derived intent and entity.

Step 316 of the method generates a natural language response 108 based on the calculated response. The natural language response 108 may include audio, graphical, textual, or other types of information the system 100 considers useful for understanding the calculated response. For example, the calculated response may result be a discrete sales increase per year derived from transaction data entries (e.g., 5% sales increase in year 1, 3% sales increase in year 2, etc.). With such a calculated response, the natural language response 108 generated by the natural language response module 218 may include a graphical representation of the annual sales increase derived from transaction data entries so that consideration by the merchant 104 may be facilitated. When the natural language query 106 from the merchant 104 seeks the reasons why a natural language response 108 was provided, the merchant 104 is provided with the analytical models used so that the merchant 104 can have an improved understanding as to why the natural language response 108 was provided.

In step 318, the natural language response 108 is transmitted to the computing device being used by the merchant 104 which is then received by the computing device at step 304. The transmitting device 220 of the processing server 102 is employed in order to transmit the natural language response 108. In instances where the natural language response 108 included a prediction, the process may also include the receipt of feedback by the receiving device 202 of the processing server 102 from the merchant 104 or in received transaction data, which may be used by the predictive module 228 in updating the predictive model(s) used in making the prediction based on corresponding data.

Figure 4:
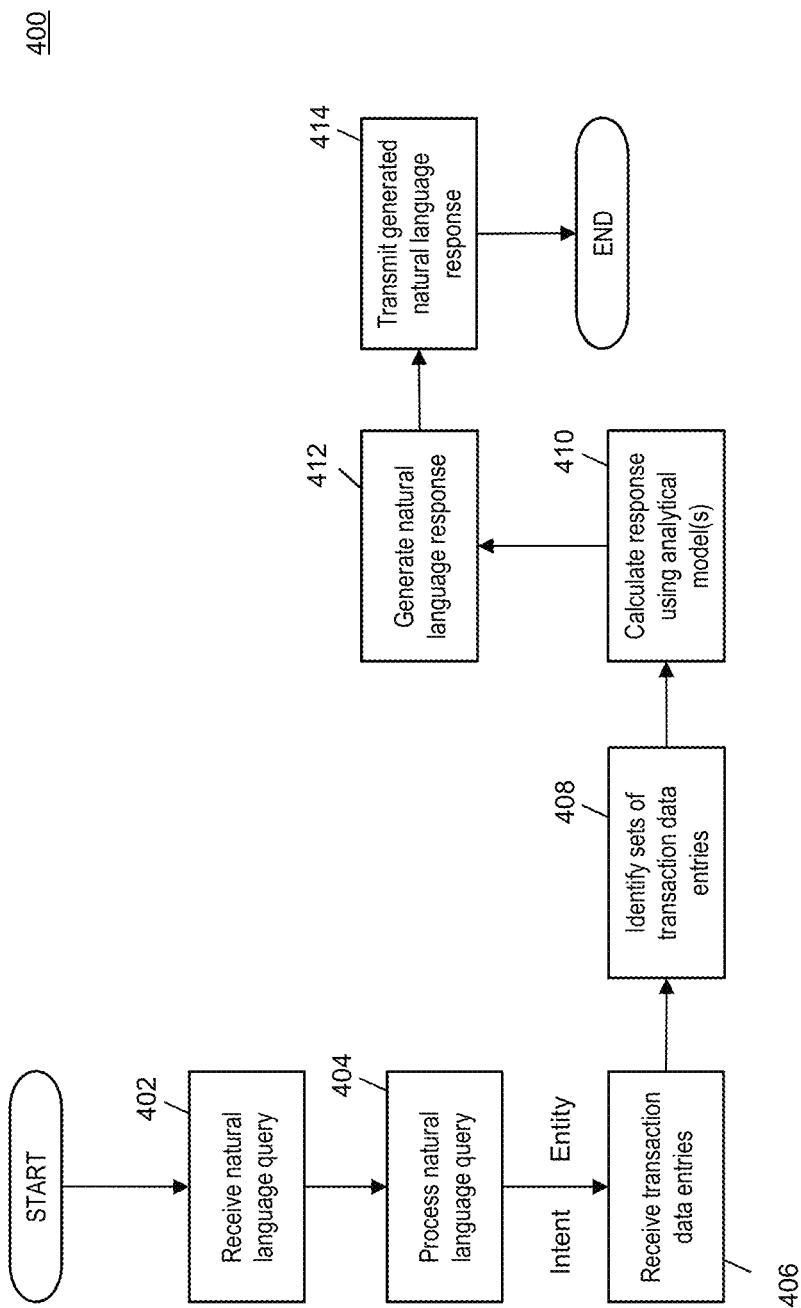
FIG. 4 depicts the process of providing sales information and insights through a conversational interface.

Process for Providing Sales Information and Insights through a Conversational Interface FIG. 4 depicts the process 400 of providing sales information and insights through a conversational interface.

At step 402, the processing server 102 receives the natural language query 106 from the computing device being used by the merchant 104. Here, the receiving device 202 of a processing server 102 may be employed to receive the natural language query 106 from the computing device being used by the merchant 104.

At step 404, the processing server 102 processes the natural language query using the natural language processor 224. The natural language query 106 is processed to derive the intent and entity. General learning algorithms grounded in statistical inferences may be employed to derive the intent and entity of natural language queries 106. Multiple classes of machine learning algorithms may be employed including decision trees and probabilistic decision models using real-valued weights so that a relative certainty as to the intended meaning of the natural language query 106 may be derived.

At steps 406 and 408, the processing server 102 uses a querying module 214 to retrieves data entries from data sources including a payment database 206, a transaction database 210, additional databases 226, and external data sources 110. More specifically, step 406 retrieves a plurality of data entries and identifies a set of the plurality of entries that satisfy certain criteria. During the execution of step 406, a query on the payment database 206 to identify payment transactions 208 related to a merchant 104 with a merchant identifier may execute either sequentially or in parallel with other queries such as queries on the transaction database 210 to identify transaction data entries 212 related to a merchant 104 with a merchant identifier. In addition, a query to an external data source 110 may execute either sequentially or in parallel with other queries so that data entries are provided. The external data sources 110 may include merchant account software on the merchant server 114, for example. Step 408 of the method identifies a set of data entries from a payment database 206, a transaction database 210, an additional database 226, and external data sources 110 that correspond to the derived intent and entity.

A response is calculated at step 410 using the calculation module 216 of the processing server 102 based on the set of data entries that correspond to the derived intent and entity. The calculated response may be made based on at least one analytical model. Multiple analytical models performing in an ensemble may also be used by the calculation module 216 to perform calculations responsive to the natural language query 106. In some embodiments, the calculation module 216 may execute calculations to identify specific trends or transactions. For example, the calculation module 216 may execute calculations to determine if the day's sales are lower than historical sales. In instances where a prediction is requested, the calculation module 216 may request the predictive module 228 to provide a prediction based on the derived intent and entity using one or more predictive models, which, in some cases, may utilize an AI.

A natural language response 108 is generated at step 412 using the natural language response module 218 of the processing server 102. The natural language response 108 is based on the calculated response generated at step 410. The natural language response 108 may include audio, graphical, textual, or other types of information the system 100 considers useful for understanding the calculated response. For example, the calculated response of step 410 may be a discrete sales increase per year derived from transaction data entries (e.g., 5% sales increase in year 1, 3% sales increase in year 2, etc.). With such a calculated response, the natural language response 108 generated by the natural language response module 218 may include a graphical representation of the annual sales increase derived from transaction data entries so that consideration by the merchant 104 may be facilitated. When the natural language query 106 from the merchant 104 seeks the reasons why a natural language response 108 was provided, the merchant 104 is provided with the analytical models used so that the merchant 104 can have an improved understanding as to why the natural language response 108 was provided.

The natural language response 108 generated at step 412 is then transmitted to the computing device being used by the merchant 104 at step 414. The transmitting device 220 of the processing server 102 is employed in order to transmit the natural language response 108.

Exemplary Method for Providing Sales Information and Insights through a Conversational Interface.

Figure 5:
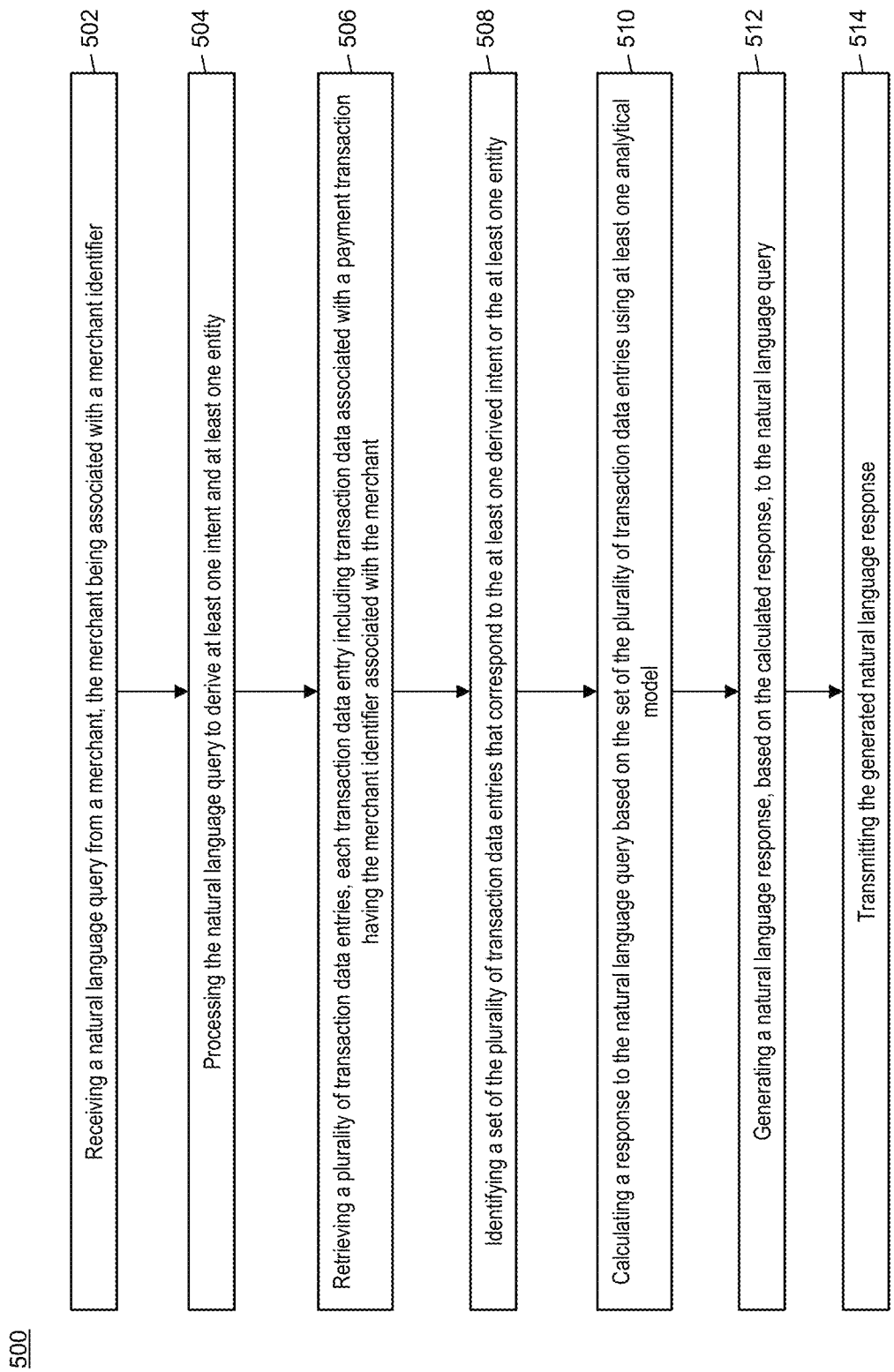
FIG. 5 illustrates a method for providing sales information and insights through a conversational interface.

FIG. 5 illustrates a method 500 for providing sales information and insights through a conversational interface.

At step 502, a natural language query 106 is received from a computing device being used by a merchant 104. The merchant 104 is associated with a merchant identifier to ensure the merchant 104 only receives information to which it is entitled. The computing device being used by the merchant 104 provides an interface through which the natural language query 106 is entered.

At step 504, the natural language query 106 is processed by the natural language processor 224 of the processing server 102. The natural language processor 224 derives at least one intent and at least one entity from the natural language query. An intent may be a performance metric, a comparison metric, a timeframe, or a target of the query. When given a natural language query 106 of "How are my sales trending this month compared to my competition," an intent of the phrase may be "my sales" (target of query), "this month" (timeframe), and "compared to my competition" (measure of performance).

At steps 506 and 508, transaction data entries are retrieved (step 506) by the querying module 214 of the processing server 102, and sets of the transaction data entries that correspond to the at least one intent or the at least one entity are identified (step 508). More particularly, step 506 involves the querying module 214 executing queries on databases 206, 210 to retrieve payment transactions 208 and transaction data entries 212 relevant to responding to the natural language query 106. At step 508, the querying module 214 identifies a set of the data that satisfy certain criteria to reduce the amount of data that must be considered when calculating a response.

At step 510, a response to the natural language query 106 is calculated by the calculation module 216. The response is based on the set of the transaction data entries retrieved by the querying module 214. The response is also based on an analytical model used by the calculation module 216 to process the retrieved data. When the merchant 104 requests the reasoning behind a particular natural language response 108, the analytical models used for the response are provided to the natural language response module 218 for further processing.

At step 512, a natural language response 108 to the natural language query 106 is generated by the natural language response module 218 based on the calculated response. The natural language response 108 is a conversational response to the natural language query 106 by the merchant 104. In some embodiments, based on the natural language query 106 by the merchant 104, the queries made by the querying module 214, and the calculations made by the calculating module 216, the natural language response module 218 generates a natural language response 108 to be provided to the merchant 104. The natural language response 108 generated by the natural language response module 218 may include audio, graphical, textual, or other types of information considered useful for facilitating the understanding of the merchant 104 of the calculated response. For example, the calculated response may result be a sales increase per year derived from transaction data entries. With such a calculated response, the natural language response 108 generated by the natural language response module 218 may include a graphical representation of the annual sales increase derived from transaction data entries so that consideration by the merchant 104 may be facilitated. When the merchant 104 requests the reasoning behind a particular natural language response 108, the analytical models are processed by the natural language response module 218 to facilitate consumption by the merchant 104.

At step 514, the generated natural language response 108 is transmitted to the computing device being used by the merchant 104. The computing device being used by the merchant 104 receives the generated natural language response 108 and presents the generated natural language response 108 using the same interface through which the natural language query 106 was received. In some embodiments, the merchant 104 may prefer to receive the generated natural language response 108 through another interface.

Exemplary Method for Providing a Proactive Alert as a Natural Language Message

Figure 6:
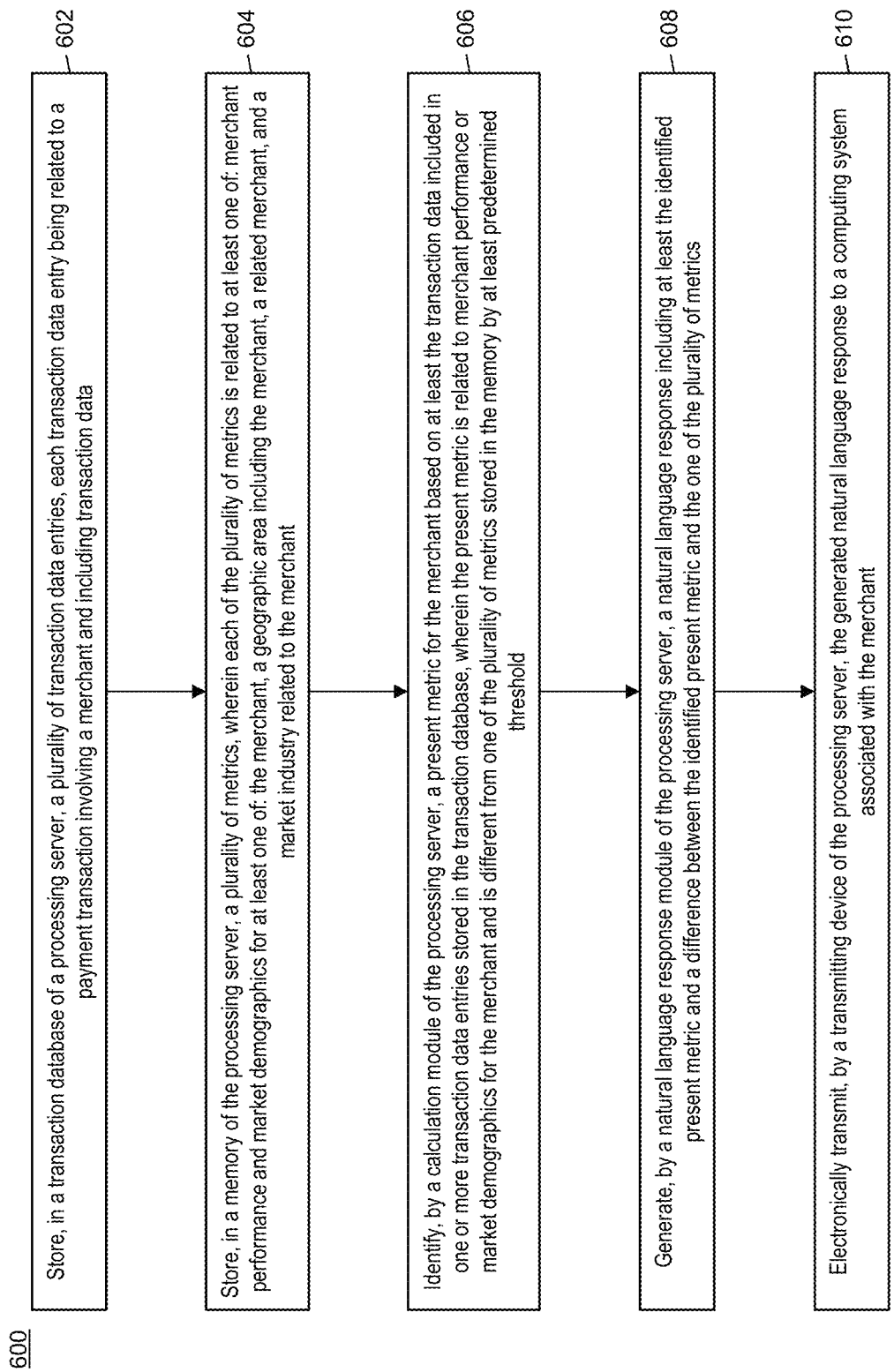
FIG. 6 illustrates a method for providing a proactive alert as a natural language response.

FIG. 6 illustrates a method 600 for the providing of a proactive alert to a merchant regarding merchant metrics using a natural language message.

In step 602, a plurality of transaction data entries (e.g., transaction data entries 212) may be stored in a transaction database (e.g., the transaction database 210) of a processing server (e.g., the processing server 102), wherein each transaction data entry is related to a payment transaction involving a merchant (e.g., the merchant 104) and includes transaction data. In step 604, a plurality of metrics may be stored in a memory (e.g., the memory 222) of the processing server, wherein each of the plurality of metrics is related to at least one of: merchant performance and market demographics for at least one of: the merchant, a geographic area including the merchant, a related merchant, and a market industry related to the merchant.

In step 606, a present metric for the merchant may be identified by a calculation module (e.g., the calculation module 216) of the processing server based on at least the transaction data included in one or more transaction data entries stored in the transaction database, wherein the present metric is related to merchant performance or market demographics for the merchant and is different from one of the plurality of metrics stored in the memory by at least predetermined threshold. In step 608, a natural language response (e.g., the natural language response 108) may be generated by a natural language response module (e.g., the natural language response module 218) of the processing server, wherein the natural language response includes at least the identified present metric and a difference between the identified present metric and the one of the plurality of metrics. In step 610, the generated natural language response may be electronically transmitted by a transmitting device (e.g., the transmitting device 220) of the processing server to a computing system associated with the merchant.

Payment Transaction Processing System and Process

Figure 7:
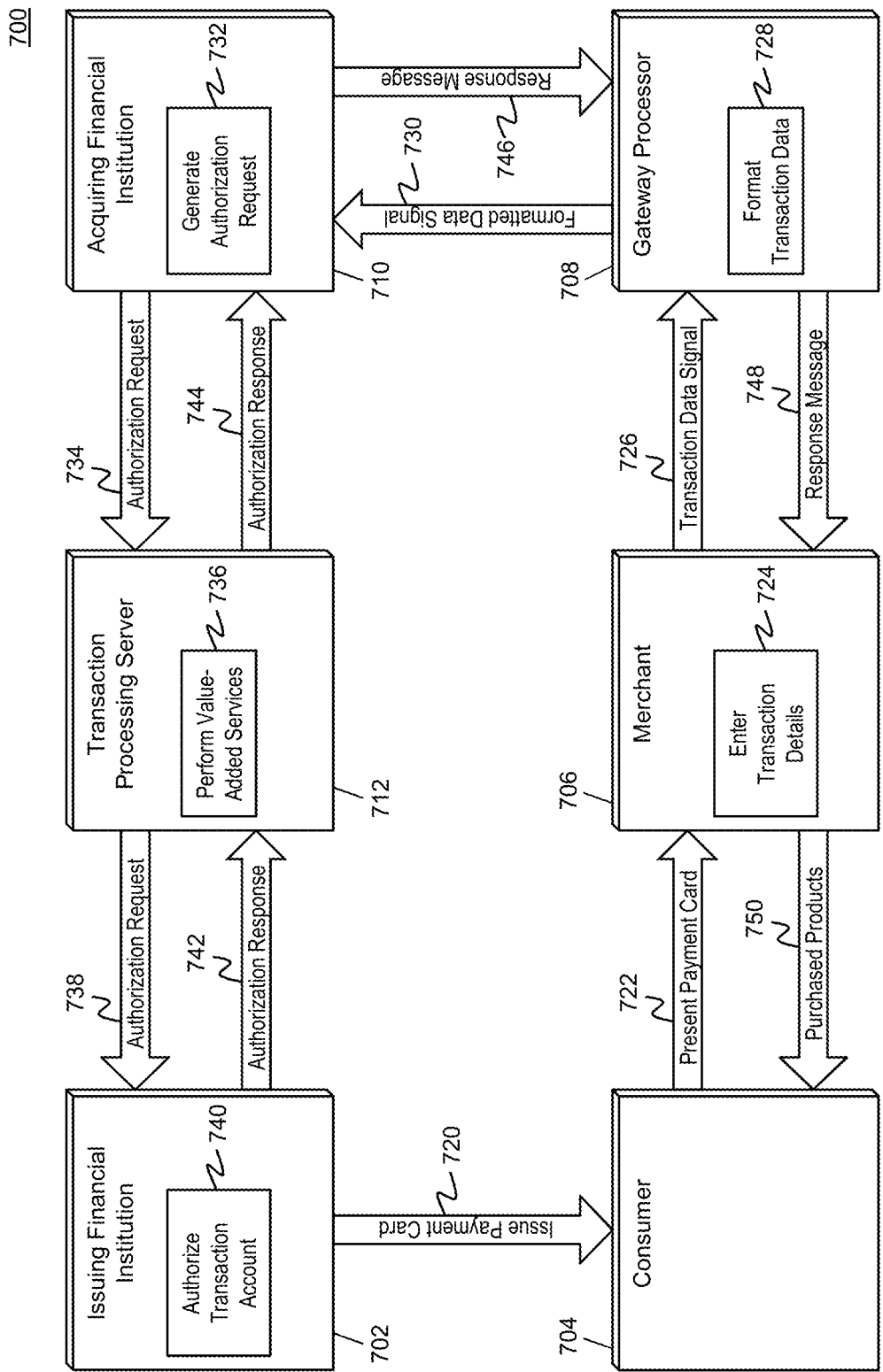
FIG. 7 depicts a transaction processing system and a process for processing of payment transactions.

FIG. 7 illustrates a transaction processing system and a process 700 for the processing of payment transactions in the system, which may include the processing of thousands, millions, or even billions of transactions during a given period (e.g., hourly, daily, weekly, etc.). The process 700 and steps included therein may be performed by one or more components of the system 100 discussed above, such as the processing server 102, merchant 104, etc. The processing of payment transactions using the system and process 700 illustrated in FIG. 7 and discussed below may utilize the payment rails, which may be comprised of the computing devices and infrastructure utilized to perform the steps of the process 700 as specially configured and programmed by the entities discussed below, including the transaction processing server 712, which may be associated with one or more payment networks configured to processing payment transactions. It will be apparent to persons having skill in the relevant art that the process 700 may be incorporated into the processes illustrated in FIGS. 3-6, discussed above, with respect to the step or steps involved in the processing of a payment transaction. In addition, the entities discussed herein for performing the process 700 may include one or more computing devices or systems configured to perform the functions discussed below. For instance, the merchant 706 may be comprised of one or more point of sale devices, a local communication network, a computing server, and other devices configured to perform the functions discussed below.

In step 720, an issuing financial institution 702 may issue a payment card or other suitable payment instrument to a consumer 704. The issuing financial institution may be a financial institution, such as a bank, or other suitable type of entity that administers and manages payment accounts and/or payment instruments for use with payment accounts that can be used to fund payment transactions. The consumer 704 may have a transaction account with the issuing financial institution 702 for which the issued payment card is associated, such that, when used in a payment transaction, the payment transaction is funded by the associated transaction account. In some embodiments, the payment card may be issued to the consumer 704 physically. In other embodiments, the payment card may be a virtual payment card or otherwise provisioned to the consumer 704 in an electronic format.

In step 722, the consumer 704 may present the issued payment card to a merchant 706 for use in funding a payment transaction. The merchant 706 may be a business, another consumer, or any entity that may engage in a payment transaction with the consumer 704. The payment card may be presented by the consumer 704 via providing the physical card to the merchant 706, electronically transmitting (e.g., via near field communication, wireless transmission, or other suitable electronic transmission type and protocol) payment details for the payment card, or initiating transmission of payment details to the merchant 706 via a third party. The merchant 706 may receive the payment details (e.g., via the electronic transmission, via reading them from a physical payment card, etc.), which may include at least a transaction account number associated with the payment card and/or associated transaction account. In some instances, the payment details may include one or more application cryptograms, which may be used in the processing of the payment transaction.

In step 724, the merchant 706 may enter transaction details into a point of sale computing system. The transaction details may include the payment details provided by the consumer 704 associated with the payment card and additional details associated with the transaction, such as a transaction amount, time and/or date, product data, offer data, loyalty data, reward data, merchant data, consumer data, point of sale data, etc. Transaction details may be entered into the point of sale system of the merchant 706 via one or more input devices, such as an optical bar code scanner configured to scan product bar codes, a keyboard configured to receive product codes input by a user, etc. The merchant point of sale system may be a specifically configured computing device and/or special purpose computing device intended for the purpose of processing electronic financial transactions and communicating with a payment network (e.g., via the payment rails). The merchant point of sale system may be an electronic device upon which a point of sale system application is run, wherein the application causes the electronic device to receive and communicated electronic financial transaction information to a payment network. In some embodiments, the merchant 706 may be an online retailer in an e-commerce transaction. In such embodiments, the transaction details may be entered in a shopping cart or other repository for storing transaction data in an electronic transaction as will be apparent to persons having skill in the relevant art.

In step 726, the merchant 706 may electronically transmit a data signal superimposed with transaction data to a gateway processor 708. The gateway processor 708 may be an entity configured to receive transaction details from a merchant 706 for formatting and transmission to an acquiring financial institution 710. In some instances, a gateway processor 708 may be associated with a plurality of merchants 706 and a plurality of acquiring financial institutions 710. In such instances, the gateway processor 708 may receive transaction details for a plurality of different transactions involving various merchants, which may be forwarded on to appropriate acquiring financial institutions 710. By having relationships with multiple acquiring financial institutions 710 and having the requisite infrastructure to communicate with financial institutions using the payment rails, such as using application programming interfaces associated with the gateway processor 708 or financial institutions used for the submission, receipt, and retrieval of data, a gateway processor 708 may act as an intermediary for a merchant 706 to be able to conduct payment transactions via a single communication channel and format with the gateway processor 708, without having to maintain relationships with multiple acquiring financial institutions 710 and payment processors and the hardware associated thereto. Acquiring financial institutions 710 may be financial institutions, such as banks, or other entities that administers and manages payment accounts and/or payment instruments for use with payment accounts. In some instances, acquiring financial institutions 710 may manage transaction accounts for merchants 706. In some cases, a single financial institution may operate as both an issuing financial institution 702 and an acquiring financial institution 710.

The data signal transmitted from the merchant 706 to the gateway processor 708 may be superimposed with the transaction details for the payment transaction, which may be formatted based on one or more standards. In some embodiments, the standards may be set forth by the gateway processor 708, which may use a unique, proprietary format for the transmission of transaction data to/from the gateway processor 708. In other embodiments, a public standard may be used, such as the International Organization for Standardization's ISO 8783 standard. The standard may indicate the types of data that may be included, the formatting of the data, how the data is to be stored and transmitted, and other criteria for the transmission of the transaction data to the gateway processor 708.

In step 728, the gateway processor 708 may parse the transaction data signal to obtain the transaction data superimposed thereon and may format the transaction data as necessary. The formatting of the transaction data may be performed by the gateway processor 708 based on the proprietary standards of the gateway processor 708 or an acquiring financial institution 710 associated with the payment transaction. The proprietary standards may specify the type of data included in the transaction data and the format for storage and transmission of the data. The acquiring financial institution 710 may be identified by the gateway processor 708 using the transaction data, such as by parsing the transaction data (e.g., deconstructing into data elements) to obtain an account identifier included therein associated with the acquiring financial institution 710. In some instances, the gateway processor 708 may then format the transaction data based on the identified acquiring financial institution 710, such as to comply with standards of formatting specified by the acquiring financial institution 710. In some embodiments, the identified acquiring financial institution 710 may be associated with the merchant 706 involved in the payment transaction, and, in some cases, may manage a transaction account associated with the merchant 706.

In step 730, the gateway processor 708 may electronically transmit a data signal superimposed with the formatted transaction data to the identified acquiring financial institution 710. The acquiring financial institution 710 may receive the data signal and parse the signal to obtain the formatted transaction data superimposed thereon. In step 732, the acquiring financial institution may generate an authorization request for the payment transaction based on the formatted transaction data. The authorization request may be a specially formatted transaction message that is formatted pursuant to one or more standards, such as the ISO 8783 standard and standards set forth by a payment processor used to process the payment transaction, such as a payment network. The authorization request may be a transaction message that includes a message type indicator indicative of an authorization request, which may indicate that the merchant 706 involved in the payment transaction is requesting payment or a promise of payment from the issuing financial institution 702 for the transaction. The authorization request may include a plurality of data elements, each data element being configured to store data as set forth in the associated standards, such as for storing an account number, application cryptogram, transaction amount, issuing financial institution 702 information, etc.

In step 734, the acquiring financial institution 710 may electronically transmit the authorization request to a transaction processing server 712 for processing. The transaction processing server 712 may be comprised of one or more computing devices as part of a payment network configured to process payment transactions. In some embodiments, the authorization request may be transmitted by a transaction processor at the acquiring financial institution 710 or other entity associated with the acquiring financial institution. The transaction processor may be one or more computing devices that include a plurality of communication channels for communication with the transaction processing server 712 for the transmission of transaction messages and other data to and from the transaction processing server 712. In some embodiments, the payment network associated with the transaction processing server 712 may own or operate each transaction processor such that the payment network may maintain control over the communication of transaction messages to and from the transaction processing server 712 for network and informational security.

In step 736, the transaction processing server 712 may perform value-added services for the payment transaction. Value-added services may be services specified by the issuing financial institution 702 that may provide additional value to the issuing financial institution 702 or the consumer 704 in the processing of payment transactions. Value-added services may include, for example, fraud scoring, transaction or account controls, account number mapping, offer redemption, loyalty processing, etc. For instance, when the transaction processing server 712 receives the transaction, a fraud score for the transaction may be calculated based on the data included therein and one or more fraud scoring algorithms and/or engines. In some instances, the transaction processing server 712 may first identify the issuing financial institution 702 associated with the transaction, and then identify any services indicated by the issuing financial institution 702 to be performed. The issuing financial institution 702 may be identified, for example, by data included in a specific data element included in the authorization request, such as an issuer identification number. In another example, the issuing financial institution 702 may be identified by the primary account number stored in the authorization request, such as by using a portion of the primary account number (e.g., a bank identification number) for identification.

In step 738, the transaction processing server 712 may electronically transmit the authorization request to the issuing financial institution 702. In some instances, the authorization request may be modified, or additional data included in or transmitted accompanying the authorization request as a result of the performance of value-added services by the transaction processing server 712. In some embodiments, the authorization request may be transmitted to a transaction processor (e.g., owned or operated by the transaction processing server 712) situated at the issuing financial institution 702 or an entity associated thereof, which may forward the authorization request to the issuing financial institution 702.

In step 740, the issuing financial institution 702 may authorize the transaction account for payment of the payment transaction. The authorization may be based on an available credit amount for the transaction account and the transaction amount for the payment transaction, fraud scores provided by the transaction processing server 712, and other considerations that will be apparent to persons having skill in the relevant art. The issuing financial institution 702 may modify the authorization request to include a response code indicating approval (e.g., or denial if the transaction is to be denied) of the payment transaction. The issuing financial institution 702 may also modify a message type indicator for the transaction message to indicate that the transaction message is changed to be an authorization response. In step 742, the issuing financial institution 702 may transmit (e.g., via a transaction processor) the authorization response to the transaction processing server 712.

In step 744, the transaction processing server 712 may forward the authorization response to the acquiring financial institution 710 (e.g., via a transaction processor). In step 746, the acquiring financial institution may generate a response message indicating approval or denial of the payment transaction as indicated in the response code of the authorization response, and may transmit the response message to the gateway processor 708 using the standards and protocols set forth by the gateway processor 708. In step 748, the gateway processor 708 may forward the response message to the merchant 706 using the appropriate standards and protocols. In step 770, assuming the transaction was approved, the merchant 706 may then provide the products purchased by the consumer 704 as part of the payment transaction to the consumer 704.

In some embodiments, once the process 700 has completed, payment from the issuing financial institution 702 to the acquiring financial institution 710 may be performed. In some instances, the payment may be made immediately or within one business day. In other instances, the payment may be made after a period of time, and in response to the submission of a clearing request from the acquiring financial institution 710 to the issuing financial institution 702 via the transaction processing server 712. In such instances, clearing requests for multiple payment transactions may be aggregated into a single clearing request, which may be used by the transaction processing server 712 to identify overall payments to be made by whom and to whom for settlement of payment transactions.

In some instances, the system may also be configured to perform the processing of payment transactions in instances where communication paths may be unavailable. For example, if the issuing financial institution is unavailable to perform authorization of the transaction account (e.g., in step 740), the transaction processing server 712 may be configured to perform authorization of transactions on behalf of the issuing financial institution 702. Such actions may be referred to as "stand-in processing," where the transaction processing server "stands in" as the issuing financial institution 702. In such instances, the transaction processing server 712 may utilize rules set forth by the issuing financial institution 702 to determine approval or denial of the payment transaction, and may modify the transaction message accordingly prior to forwarding to the acquiring financial institution 710 in step 744. The transaction processing server 712 may retain data associated with transactions for which the transaction processing server 712 stands in, and may transmit the retained data to the issuing financial institution 702 once communication is reestablished. The issuing financial institution 702 may then process transaction accounts accordingly to accommodate for the time of lost communication.

In another example, if the transaction processing server 712 is unavailable for submission of the authorization request by the acquiring financial institution 710, then the transaction processor at the acquiring financial institution 710 may be configured to perform the processing of the transaction processing server 712 and the issuing financial institution 702. The transaction processor may include rules and data suitable for use in making a determination of approval or denial of the payment transaction based on the data included therein. For instance, the issuing financial institution 702 and/or transaction processing server 712 may set limits on transaction type, transaction amount, etc. that may be stored in the transaction processor and used to determine approval or denial of a payment transaction based thereon. In such instances, the acquiring financial institution 710 may receive an authorization response for the payment transaction even if the transaction processing server 712 is unavailable, ensuring that transactions are processed and no downtime is experienced even in instances where communication is unavailable. In such cases, the transaction processor may store transaction details for the payment transactions, which may be transmitted to the transaction processing server 712 (e.g., and from there to the associated issuing financial institutions 702) once communication is reestablished.

In some embodiments, transaction processors may be configured to include a plurality of different communication channels, which may utilize multiple communication cards and/or devices, to communicate with the transaction processing server 712 for the sending and receiving of transaction messages. For example, a transaction processor may be comprised of multiple computing devices, each having multiple communication ports that are connected to the transaction processing server 712. In such embodiments, the transaction processor may cycle through the communication channels when transmitting transaction messages to the transaction processing server 712, to alleviate network congestion and ensure faster, smoother communications. Furthermore, in instances where a communication channel may be interrupted or otherwise unavailable, alternative communication channels may thereby be available, to further increase the uptime of the network.

In some embodiments, transaction processors may be configured to communicate directly with other transaction processors. For example, a transaction processor at an acquiring financial institution 710 may identify that an authorization request involves an issuing financial institution 702 (e.g., via the bank identification number included in the transaction message) for which no value-added services are required. The transaction processor at the acquiring financial institution 710 may then transmit the authorization request directly to the transaction processor at the issuing financial institution 702 (e.g., without the authorization request passing through the transaction processing server 712), where the issuing financial institution 702 may process the transaction accordingly.

The methods discussed above for the processing of payment transactions that utilize multiple methods of communication using multiple communication channels, and includes fail safes to provide for the processing of payment transactions at multiple points in the process and at multiple locations in the system, as well as redundancies to ensure that communications arrive at their destination successfully even in instances of interruptions, may provide for a robust system that ensures that payment transactions are always processed successfully with minimal error and interruption. This advanced network and its infrastructure and topology may be commonly referred to as "payment rails," where transaction data may be submitted to the payment rails from merchants at millions of different points of sale, to be routed through the infrastructure to the appropriate transaction processing servers 712 for processing. The payment rails may be such that a general purpose computing device may be unable to properly format or submit communications to the rails, without specialized programming and/or configuration. Through the specialized purposing of a computing device, the computing device may be configured to submit transaction data to the appropriate entity (e.g., a gateway processor 708, acquiring financial institution 710, etc.) for processing using this advanced network, and to quickly and efficiently receive a response regarding the ability for a consumer 704 to fund the payment transaction.

Computer System Architecture

Figure 8:
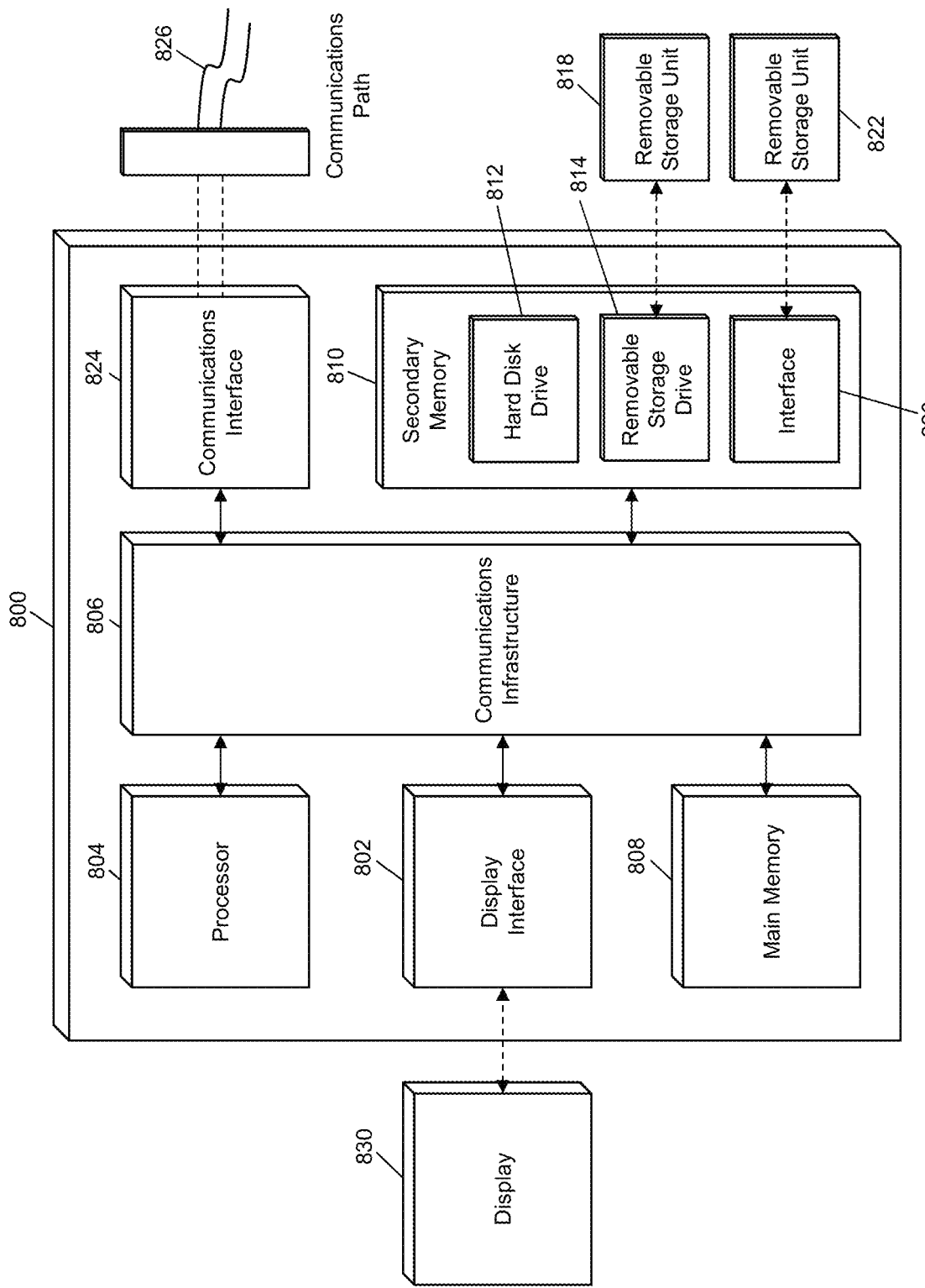
FIG. 8 depicts a computer system architecture.

FIG. 8 illustrates a computer system 800 in which embodiments of the present disclosure, or portions thereof, may be implemented as computer-readable code. For example, the processing server of FIG. 1 may be implemented in the computer system 800 using hardware, software, firmware, non-transitory computer readable media having instructions stored thereon, or a combination thereof and may be implemented in one or more computer systems or other processing systems. Hardware, software, or any combination thereof may embody modules and components used to implement the methods of FIGS. 3-7.

If programmable logic is used, such logic may execute on a commercially available processing platform configured by executable software code to become a specific purpose computer or a special purpose device (e.g., programmable logic array, application-specific integrated circuit, etc.). A person having ordinary skill in the art may appreciate that embodiments of the disclosed subject matter can be practiced with various computer system configurations, including multi-core multiprocessor systems, minicomputers, mainframe computers, computers linked or clustered with distributed functions, as well as pervasive or miniature computers that may be embedded into virtually any device. For instance, at least one processor device and a memory may be used to implement the above described embodiments.

A processor unit or device as discussed herein may be a single processor, a plurality of processors, or combinations thereof. Processor devices may have one or more processor "cores." The terms "computer program medium," "non-transitory computer readable medium," and "computer usable medium" as discussed herein are used to generally refer to tangible media such as a removable storage unit 818, a removable storage unit 822, and a hard disk installed in hard disk drive 812.

Various embodiments of the present disclosure are described in terms of this example computer system 800. After reading this description, it will become apparent to a person skilled in the relevant art how to implement the present disclosure using other computer systems and/or computer architectures. Although operations may be described as a sequential process, some of the operations may in fact be performed in parallel, concurrently, and/or in a distributed environment, and with program code stored locally or remotely for access by single or multi-processor machines. In addition, in some embodiments the order of operations may be rearranged without departing from the spirit of the disclosed subject matter.

Processor device 804 may be a special purpose or a general purpose processor device specifically configured to perform the functions discussed herein. The processor device 804 may be connected to a communications infrastructure 806, such as a bus, message queue, network, multi-core message-passing scheme, etc. The network may be any network suitable for performing the functions as disclosed herein and may include a local area network (LAN), a wide area network (WAN), a wireless network (e.g., Wi-Fi), a mobile communication network, a satellite network, the Internet, fiber optic, coaxial cable, infrared, radio frequency (RF), or any combination thereof. Other suitable network types and configurations will be apparent to persons having skill in the relevant art. The computer system 800 may also include a main memory 808 (e.g., random access memory, read-only memory, etc.), and may also include a secondary memory 810. The secondary memory 810 may include the hard disk drive 812 and a removable storage drive 814, such as a floppy disk drive, a magnetic tape drive, an optical disk drive, a flash memory, etc.

The removable storage drive 814 may read from and/or write to the removable storage unit 818 in a well-known manner. The removable storage unit 818 may include a removable storage media that may be read by and written to by the removable storage drive 814. For example, if the removable storage drive 814 is a floppy disk drive or universal serial bus port, the removable storage unit 818 may be a floppy disk or portable flash drive, respectively. In one embodiment, the removable storage unit 818 may be non-transitory computer readable recording media.

In some embodiments, the secondary memory 810 may include alternative means for allowing computer programs or other instructions to be loaded into the computer system 800, for example, the removable storage unit 822 and an interface 820. Examples of such means may include a program cartridge and cartridge interface (e.g., as found in video game systems), a removable memory chip (e.g., EEPROM, PROM, etc.) and associated socket, and other removable storage units 822 and interfaces 820 as will be apparent to persons having skill in the relevant art.

Data stored in the computer system 800 (e.g., in the main memory 808 and/or the secondary memory 810) may be stored on any type of suitable computer readable media, such as optical storage (e.g., a compact disc, digital versatile disc, Blu-ray disc, etc.) or magnetic tape storage (e.g., a hard disk drive). The data may be configured in any type of suitable database configuration, such as a relational database, a structured query language (SQL) database, a distributed database, an object database, etc. Suitable configurations and storage types will be apparent to persons having skill in the relevant art.

The computer system 800 may also include a communications interface 824. The communications interface 824 may be configured to allow software and data to be transferred between the computer system 800 and external devices. Exemplary communications interfaces 824 may include a modem, a network interface (e.g., an Ethernet card), a communications port, etc. Software and data transferred via the communications interface 824 may be in the form of signals, which may be electronic, electromagnetic, optical, or other signals as will be apparent to persons having skill in the relevant art. The signals may travel via a communications path 826, which may be configured to carry the signals and may be implemented using wire, cable, fiber optics, a phone line, a cellular phone link, a radio frequency link, etc.

The computer system 800 may further include a display interface 802. The display interface 802 may be configured to allow data to be transferred between the computer system 800 and external display 830. Exemplary display interfaces 802 may include high-definition multimedia interface (HDMI), digital visual interface (DVI), video graphics array (VGA), etc. The display 830 may be any suitable type of display for displaying data transmitted via the display interface 802 of the computer system 800, including a cathode ray tube (CRT) display, liquid crystal display (LCD), light-emitting diode (LED) display, capacitive touch display, thin-film transistor (TFT) display, etc.

Computer program medium and computer usable medium may refer to memories, such as the main memory 808 and secondary memory 810, which may be memory semiconductors (e.g., DRAM, etc.). These computer program products may be means for providing software to the computer system 800. Computer programs (e.g., computer control logic) may be stored in the main memory 808 and/or the secondary memory 810. Computer programs may also be received via the communications interface 824. Such computer programs, when executed, may enable computer system 800 to implement the present methods as discussed herein. In particular, the computer programs, when executed, may enable processor device 804 to implement the methods illustrated by FIGS. 3-7, as discussed herein. Accordingly, such computer programs may represent controllers of the computer system 800. Where the present disclosure is implemented using software, the software may be stored in a computer program product and loaded into the computer system 800 using the removable storage drive 814, interface 820, and hard disk drive 812, or communications interface 824.

The processor device 804 may comprise one or more modules or engines configured to perform the functions of the computer system 800. Each of the modules or engines may be implemented using hardware and, in some instances, may also utilize software, such as corresponding to program code and/or programs stored in the main memory 808 or secondary memory 810. In such instances, program code may be compiled by the processor device 804 (e.g., by a compiling module or engine) prior to execution by the hardware of the computer system 800. For example, the program code may be source code written in a programming language that is translated into a lower level language, such as assembly language or machine code, for execution by the processor device 804 and/or any additional hardware components of the computer system 800. The process of compiling may include the use of lexical analysis, preprocessing, parsing, semantic analysis, syntax-directed translation, code generation, code optimization, and any other techniques that may be suitable for translation of program code into a lower level language suitable for controlling the computer system 800 to perform the functions disclosed herein. It will be apparent to persons having skill in the relevant art that such processes result in the computer system 800 being a specially configured computer system 800 uniquely programmed to perform the functions discussed above.

Techniques consistent with the present disclosure provide, among other features, systems and methods for location scoring in a transaction based on item redemption. While various exemplary embodiments of the disclosed system and method have been described above it should be understood that they have been presented for purposes of example only, not limitations. It is not exhaustive and does not limit the disclosure to the precise form disclosed. Modifications and variations are possible in light of the above teachings or may be acquired from practicing of the disclosure, without departing from the breadth or scope.

What is claimed is:

1. A method of providing responses to a natural language query, comprising:

receiving a natural language query from a merchant, the merchant being associated with a merchant identifier;

processing the natural language query to derive at least one intent and at least one entity, wherein the at least one entity is related to a market of the merchant and is derived from at least the merchant identifier associated with the merchant;

retrieving a plurality of transaction data entries, each transaction data entry including transaction data associated with a payment transaction having the merchant identifier associated with the merchant;

identifying a set of the plurality of transaction data entries that correspond to the at least one derived intent or the at least one entity;
calculating a response to the natural language query based on the set of the plurality of transaction data entries using at least one analytical model;
generating a natural language response, based on the calculated response, to the natural language query; and
transmitting the generated natural language response.

2. The method of claim 1, further comprising:
retrieving a plurality of external information associated with the at least derived one intent or the at least one entity from at least one external data source; and
identifying a set of the plurality of external information that correspond to the at least one derived intent or the at least one entity;
wherein the calculated response is further based on the set of the plurality of external information.

3. The method of claim 1, wherein the at least one derived intent includes a scheduled task for monitoring the plurality of transaction data entries, the scheduled task having at least one triggering threshold;
wherein the identified set of the plurality of transaction data entries is updated based on the triggering threshold; and
wherein the calculated response is updated based on the triggering threshold and the updated identified set of the plurality of transactions.

4. The method of claim 1, wherein the derived intent is a request for explaining the generated natural language response; and
transmitting the at least one analytical model.

5. The method of claim 1, further comprising retrieving another plurality of transaction data entries, each transaction data entry including transaction data associated with a payment transaction not having the merchant identifier associated with the merchant.

6. The method of claim 5, wherein the calculated response is further based on the another plurality of external information, the calculated response removing identifying information from the another plurality of external information.

7. The method of claim 2, where the at least one data source includes merchant accounting software executing on a merchant server.

8. The method of claim 1, wherein the at least one derived intent includes one of a performance metric, a comparison metric, a timeframe, and a target user.

9. The method of claim 1, further comprising:
identifying a prediction of future performance related to the at least one derived intent, wherein
the natural language response includes the prediction of future performance.

10. The method of claim 9, wherein the prediction of future performance is identified by an artificial intelligence.

11. A system providing responses to a natural language query, comprising:
a computing device configured to input into an interface a natural language query created by a merchant; and
a processing server comprising:
a receiving device configured to receive the natural language query being input into the computing device being used by the merchant, the merchant being associated with a merchant identifier;
a natural language processor configured to derive at least one intent and at least one entity, wherein the at least one entity is related to a market of the merchant and is derived from at least the merchant identifier associated with the merchant;
a querying module configured to retrieve a plurality of transaction data entries, each transaction data entry including transaction data associated with a payment transaction having the merchant identifier associated with the merchant;
the querying module being further configured to identify a set of the plurality of transaction data entries that correspond to the at least one derived intent or the at least one entity;
a calculation module configured to calculate a response to the natural language query based on the set of the plurality of transaction data entries using at least one analytical model;
a natural language response module configured to generate a natural language response, based on the calculated response, to the natural language query; and
a transmitting device configured to transmit the generated natural language response.

12. The system of claim 11, wherein the querying module is further configured to:
retrieve a plurality of external information associated with the at least derived one intent or the at least one entity from at least one external data source;
identify a set of the plurality of external information that correspond to the at least one derived intent or the at least one entity; and
wherein the calculation module is further configured to calculate the response based on the set of the plurality of external information.

13. The system of claim 11, wherein the natural language processor derived intent includes a scheduled task for monitoring the plurality of transaction data entries, the scheduled task having at least one triggering threshold;
wherein the querying module updates the identified set of the plurality of transaction data entries based on the triggering threshold; and
wherein the calculation module updates the calculated response based on the triggering threshold and the updated identified set of the plurality of transactions.

14. The system of claim 11, wherein the receiving device receives a request from the computing device of the merchant to explain the generated natural language response;
wherein the natural language processor determines the derived intent is a request for explaining the generated natural language response; and
wherein the transmitting device transmits the at least one analytical model used by the calculation module to generate the response on which the generated natural language response is based.

15. The system of claim 11, wherein the querying module is further configured to retrieve another plurality of transaction data entries, each transaction data entry including transaction data associated with a payment transaction not having the merchant identifier associated with the merchant; and
wherein the calculation module calculated response is further based on the another plurality of external information.

16. The system of claim 15, wherein the querying module is further configured to remove identifying information from the another plurality of transaction data entries.

17. The system of claim 12, where the at least one data source includes merchant accounting software executing on a merchant server.

18. The system of claim 11, wherein the at least one derived intent includes one of a performance metric, a comparison metric, a timeframe, and a target user.

19. The system of claim 11, further comprising:
a predictive module configured to identify a prediction of future performance related to the at least one derived intent, wherein
the natural language response includes the prediction of future performance.

20. The system of claim 19, wherein the prediction of future performance is identified by an artificial intelligence.

21. A method for providing a proactive alert as a natural language message, comprising:
storing, in a transaction database of a processing server, a plurality of transaction data entries, each transaction data entry being related to a payment transaction involving a merchant and including transaction data;
storing, in a memory of the processing server, a plurality of metrics, wherein each of the plurality of metrics is related to at least one of: merchant performance and market demographics for at least one of: the merchant, a geographic area including the merchant, a related merchant, and a market industry related to the merchant;
scheduling, by the processing server, a single or recurrent proactive alert by deriving at least one intent from a natural language query, wherein the derived intent is a request for explaining a natural language response to be generated;
identifying, by a calculation module of the processing server, a present metric for the merchant based on at least the transaction data included in one or more transaction data entries stored in the transaction database, wherein the present metric is related to merchant performance or market demographics for the merchant and is different from one of the plurality of metrics stored in the memory by at least predetermined threshold;
generating, by a natural language response module of the processing server, the natural language response as a proactive alert including at least the identified present metric and a difference between the identified present metric and the one of the plurality of metrics; and
electronically transmitting, by a transmitting device of the processing server, the generated natural language response to a computing system associated with the merchant.

22. A system for providing a proactive alert as a natural language message, comprising:
a transaction database of a processing server configured to store a plurality of transaction data entries, each transaction data entry being related to a payment transaction involving a merchant and including transaction data;
a memory of the processing server configured to store a plurality of metrics, wherein each of the plurality of metrics is related to at least one of: merchant performance and market demographics for at least one of: the merchant, a geographic area including the merchant, a related merchant, and a market industry related to the merchant;
a natural language processor of the processing server configured to process a natural language query for scheduling a single or recurrent proactive alert by deriving at least one intent from the natural language query, wherein the derived at least one intent is a request for explaining a natural language response to be generated;
a calculation module of the processing server configured to identify a present metric for the merchant based on at least the transaction data included in one or more transaction data entries stored in the transaction database, wherein the present metric is related to merchant performance or market demographics for the merchant and is different from one of the plurality of metrics stored in the memory by at least predetermined threshold;
a natural language response module of the processing server configured to generate the natural language response as a proactive alert including at least the identified present metric and a difference between the identified present metric and the one of the plurality of metrics; and
a transmitting device of the processing server configured to electronically transmit the generated natural language response to a computing system associated with the merchant.

* * * * *